United States Patent
Chung et al.

(10) Patent No.: US 9,236,992 B2
(45) Date of Patent: Jan. 12, 2016

(54) METHOD AND APPARATUS FOR TRANSCEIVING SCHEDULING SIGNALS IN A MULTI-CARRIER WIRELESS COMMUNICATION SYSTEM

(75) Inventors: Jae Hoon Chung, Anyang-si (KR); Sung Ho Moon, Anyang-si (KR); Moon Il Lee, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 13/389,430

(22) PCT Filed: Sep. 17, 2010

(86) PCT No.: PCT/KR2010/006398
§ 371 (c)(1),
(2), (4) Date: Apr. 5, 2012

(87) PCT Pub. No.: WO2011/034369
PCT Pub. Date: Mar. 24, 2011

(65) Prior Publication Data
US 2012/0182950 A1    Jul. 19, 2012

Related U.S. Application Data

(60) Provisional application No. 61/243,550, filed on Sep. 18, 2009, provisional application No. 61/250,872, filed on Oct. 13, 2009, provisional application No. 61/259,991, filed on Nov. 10, 2009.

(51) Int. Cl.
*H04L 5/00* (2006.01)

(52) U.S. Cl.
CPC ............. *H04L 5/0053* (2013.01); *H04L 5/0023* (2013.01)

(58) Field of Classification Search
CPC ............................ H04L 5/0023; H04L 5/0053
See application file for complete search history.

(56) References Cited

U.S. PATENT DOCUMENTS

2008/0205348 A1    8/2008  Malladi
2009/0088148 A1    4/2009  Chung et al.
(Continued)

FOREIGN PATENT DOCUMENTS

CN          1516942 A       7/2004
CN        101478824 A       7/2009
(Continued)

OTHER PUBLICATIONS

Wengerter et al ("Configuration Control Channel in a Mobile Communication System" WO 2008083804 A2 published Jul. 17, 2008) Same as Document N.*
(Continued)

*Primary Examiner* — Andrew Lai
*Assistant Examiner* — Hoyet H Andrews
(74) *Attorney, Agent, or Firm* — Dentons US LLP

(57) ABSTRACT

The present invention relates to a method for transceiving scheduling signals in a multi-carrier wireless communication system, comprising a step of transmitting, via a predetermined downlink component carrier, a PDSCH transmission scheduling signal on one or more downlink component carriers and/or a PUSCH transmission scheduling signal on one or more uplink component carriers; and a step of transceiving the PDSCH and/or the PUSCH in accordance with the scheduling signals. The scheduling signals can be defined to the same size in a PDCCH transmission region of said predetermined downlink component carrier in the event different MIMO transmission modes are applied to the PDSCH transmission or the PUSCH transmission, or in the event said one or more downlink component carriers or said one or more uplink component carriers have different bandwidths.

16 Claims, 15 Drawing Sheets

(56) References Cited

U.S. PATENT DOCUMENTS

| | | | |
|---|---|---|---|
| 2010/0023830 A1* | 1/2010 | Wengerter | H04L 1/0025 714/748 |
| 2010/0034139 A1* | 2/2010 | Love et al. | 370/328 |
| 2010/0279628 A1* | 11/2010 | Love | H04L 5/0091 455/70 |
| 2010/0331030 A1* | 12/2010 | Nory | H04L 5/0053 455/509 |
| 2011/0194514 A1* | 8/2011 | Lee | H04L 1/0038 370/329 |

FOREIGN PATENT DOCUMENTS

| | | | | |
|---|---|---|---|---|
| CN | 101488832 A | 7/2009 | | |
| WO | 2008/092160 A2 | 7/2008 | | |
| WO | WO 2008083804 A2 * | 7/2008 | | H04L 5/02 |
| WO | WO 2008083804 A3 * | 10/2008 | | H04L 1/0017 |

OTHER PUBLICATIONS

Panasonic ("PDCCH payload formats and sizes" R1-074401 3GPP TSG-RAN WG1) available Oct. 12, 2007.*

Third Generation Partnership Project , "LTE; Evolved Universal Terrestrial Radio Access (E-UTRA); Physical layer procedures (3GPP TS 36.213 version 8.7.0 Release 8)", Document No. 36.213, published Jun. 2009.*

3rd Generation Partnership Project; Technical Specification Group Radio Access Network; Evolved Universal Terrestrial Radio Access (E-UTRA); Multiplexing and channel coding (Release 8) publically available Mar. 2009 Document No. 36.212.*

R1-074401, titled, "PDCCH payload formats and sizes", provided by 3GPP TSG-RAN WG1 during Meeting #50b, held in Shanghai, China, on Oct. 8-12, 2007.*

3GPP TS 36.211 v8.7.0, titled,"3rd Generation Partnership Project; Technical Specification Group Radio Access Network; Evolved Universal Terrestrial Radio Access (E-UTRA); Physical Channels and Modulation, (Release 8)", published May 2009.*

3GPP TS 36.213 V8.7.0, "Technical Specification Group Radio Access Network; Evolved Universal Terrestrial Radio Access (E-UTRA); Physical Layer Procedures (Release 8)", May 2009 (See Section 7.1).

* cited by examiner (a)

(b)

(a)

(b)

(c)

(a)

(b)

(a)

(b)

METHOD AND APPARATUS FOR TRANSCEIVING SCHEDULING SIGNALS IN A MULTI-CARRIER WIRELESS COMMUNICATION SYSTEM

This Application is a 35 U.S.C. §371 National Stage Entry of International Application No. PCT/KR2010/006398, filed on Sep. 17, 2010, which claims the benefit of priority to US Provisional Application Nos. 61/243,550, filed on Sep. 18, 2009, 61/250,872, filed Oct. 13, 2009 and 61/259,991, filed Nov. 10, 2009, all of which are hereby incorporated by reference in their entirety for all purposes as if fully set forth herein.

TECHNICAL FIELD

The following description relates to a wireless communication system, and more particularly, to a method and apparatus for transmitting and receiving scheduling signals in a multi-carrier wireless communication system.

BACKGROUND ART

In a general wireless communication system, only one carrier is considered even though an uplink and downlink are set to different bandwidths. For example, an uplink and downlink are respectively configured with one carrier and bandwidths of the uplink and downlink are symmetrical on a single carrier basis in a wireless communication system.

ITU (International Telecommunication Union) requires a candidate technology for IMT-Advanced to support an extended bandwidth compared to the existing wireless communication system. However, it is difficult to allocate a frequency with a wide bandwidth in general. Accordingly, carrier aggregation, bandwidth aggregation or spectrum aggregation is developed which physically combines a plurality of bands in a frequency domain to create an effect of using a logically wide band in order to use segmented narrow bands.

Carrier aggregation is introduced in order to support increased throughput, prevent cost increase due to introduction of broadband RF elements and guarantee compatibility with existing systems. This carrier aggregation enables data exchange between a user equipment (UE) and a base station (BS) by combining a plurality of carriers on a bandwidth basis, defined in a conventional wireless communication system (e.g. a 3GPP LTE release 8 or 9 system in the case of a 3GPP LTE-Advanced system). Here, the carrier defined in the conventional wireless communication system can be referred to as a component carrier (CC). Carrier aggregation, wherein one or more CCs are used on each of an uplink and downlink, can be used. The carrier aggregation can include technologies that support system bandwidths of up to 100 MHz corresponding to a group of five CCs even if a single CC supports a bandwidth of 5 MHz, 10 MHz or 20 MHz.

DETAILED DESCRIPTION OF THE INVENTION

Technical Problems

In a case that an individual transmission mode is applied to each CC in a carrier aggregation (i.e., multi-carrier) wireless communication system, scheduling for uplink/downlink data transmission in this case can be signaled through a downlink control channel. An object of the present invention is to provide a method and apparatus for efficiently signaling scheduling while reducing signaling overhead and complexity of a transceiver when a transmission mode is applied to each carrier.

Technical problems to be solved by the present invention are not limited to the above-mentioned technical problem, and other technical problems not mentioned above can be clearly understood by one skilled in the art from the following description.

Technical Solutions

A method for transmitting scheduling signals in a multi-carrier wireless communication system in accordance with one aspect of the present invention includes: transmitting, via a predetermined downlink component carrier (DL CC), at least one of a scheduling signal for Physical Downlink Shared Channel (PDSCH) transmission on one or more DL CCs or a scheduling signal for Physical Uplink Shared Channel (PUSCH) transmission on one or more uplink component carriers (UL CCs); and performing at least one of the PDSCH transmitting or PUSCH receiving according to the scheduling signals, wherein the scheduling signals are defined to the same size in a PDCCH transmission region of the predetermined DL CC when different Multiple Input Multiple Output (MIMO) transmission modes are applied to the PDSCH transmission or the PUSCH transmission, or when the one or more DL CCs or the one or more UL CCs have different bandwidths.

MIMO transmission modes may be respectively applied to the PDSCH transmission for each of the one or more DL CCs, and MIMO transmission modes may be respectively applied to the PDSCH transmission for each of the one or more DL CCs.

The scheduling signals may be defined to the same size in the PDCCH transmission region of the predetermined DL CC by applying bit padding to scheduling information defined to different sizes for different MIMO transmission modes.

The scheduling signals may include a MIMO transmission mode indicator.

The scheduling signals may be defined to the same size by transmitting, in the PDCCH transmission region of the predetermined DL CC, common control information from among scheduling information having different sizes for different MIMO transmission modes, and the remaining control information other than the common control information may be transmitted in a PDSCH transmission region of the predetermined DL CC.

The common control information may include at least one of frequency resource allocation information, a MIMO transmission mode indicator, modulation and coding scheme (MCS) indexes for PDSCH and PUSCH, a new data indicator (NDI), a redundancy version (RV), a PDSCH transmission precoding matrix index (TPMI), MIMO transmission modes for the remaining control information, MCS indexes for the remaining control information, or information about physical resource sizes for the remaining control information.

The scheduling signals may be configured in a downlink control information (DCI) format.

The predetermined DL CC may be a primary carrier.

A method for receiving scheduling signals in a multi-carrier wireless communication system in accordance with another aspect of the present invention includes: receiving, via a predetermined DL CC, at least one of a scheduling signal for Physical Downlink Shared Channel (PDSCH) transmission on one or more DL CCs or a scheduling signal for Physical Uplink Shared Channel (PUSCH) transmission on one or more uplink component carriers (UL CCs); and performing at least one of the PDSCH receiving or PUSCH transmitting according to the scheduling signals, wherein the scheduling signals are defined to the same size in a PDCCH transmission region of the predetermined DL CC when different Multiple Input Multiple Output (MIMO) transmission modes are applied to the PDSCH transmission or the PUSCH transmission, or when the one or more DL CCs or the one or more UL CCs have different bandwidths.

MIMO transmission modes may be respectively applied to the PDSCH transmission for each of the one or more DL CCs, and MIMO transmission modes may be respectively applied to the PDSCH transmission for each of the one or more DL CCs.

The scheduling signals may be defined to the same size in the PDCCH transmission region of the predetermined DL CC by applying bit padding to scheduling information defined to different sizes for different MIMO transmission modes.

The scheduling signals may include a MIMO transmission mode indicator.

The scheduling signals may be defined to the same size by transmitting, in the PDCCH transmission region of the predetermined DL CC, common control information from among scheduling information having different sizes for different MIMO transmission modes, and the remaining control information other than the common control information is transmitted in a PDSCH transmission region of the predetermined DL CC.

The common control information may include at least one of frequency resource allocation information, a MIMO transmission mode indicator, modulation and coding scheme (MCS) indexes for PDSCH and PUSCH, a new data indicator (NDI), a redundancy version (RV), a PDSCH transmission precoding matrix index (TPMI), MIMO transmission modes for the remaining control information, MCS indexes for the remaining control information, or information about physical resource sizes for the remaining control information.

The scheduling signals may be configured in a DCI format.

The predetermined DL CC may be a primary carrier.

An eNB that transmits scheduling signals in a multi-carrier wireless communication system in accordance with another aspect of the present invention includes: a reception module for receiving an uplink signal from a UE; a transmission module for transmitting a downlink signals to the UE; and a processor for controlling the reception module and the transmission module, wherein the processor is configured to transmit, via a predetermined DL CC, at least one of a scheduling signal for Physical Downlink Shared Channel (PDSCH) transmission on one or more DL CCs or a scheduling signal for Physical Uplink Shared Channel (PUSCH) transmission on one or more uplink component carriers (UL CCs); and to perform at least one of the PDSCH transmitting or PUSCH receiving according to the scheduling signals, wherein the scheduling signals are defined to the same size in a PDCCH transmission region of the predetermined DL CC when different Multiple Input Multiple Output (MIMO) transmission modes are applied to the PDSCH transmission or the PUSCH transmission, or when the one or more DL CCs or the one or more UL CCs have different bandwidths.

A UE that receives scheduling signals in a multi-carrier wireless communication system in accordance with another aspect of the present invention includes: a reception module for receiving a downlink signal from an eNB; a transmission module for transmitting an uplink signals to the eNB; and a processor for controlling the reception module and the transmission module, wherein the processor is configured to receive, via a predetermined DL CC, at least one of a scheduling signal for Physical Downlink Shared Channel (PDSCH) transmission on one or more DL CCs or a scheduling signal for Physical Uplink Shared Channel (PUSCH) transmission on one or more uplink component carriers (UL CCs); and to performing at least one of the PDSCH receiving or PUSCH transmitting according to the scheduling signals, wherein the scheduling signals are defined to the same size in a PDCCH transmission region of the predetermined DL CC when different Multiple Input Multiple Output (MIMO) transmission modes are applied to the PDSCH transmission or the PUSCH transmission, or when the one or more DL CCs or the one or more UL CCs have different bandwidths.

It is to be understood that both the foregoing general description and the following detailed description of the present invention are exemplary and explanatory and are intended to provide further explanation of the invention as claimed.

Advantageous Effects

According to the present invention, a method and apparatus for effectively transceiving scheduling signals while reducing signaling overhead and complexity at a transceiver when transmission modes are respectively applied for carriers can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

BEST MODE FOR CARRYING OUT THE INVENTION

Figure 1:
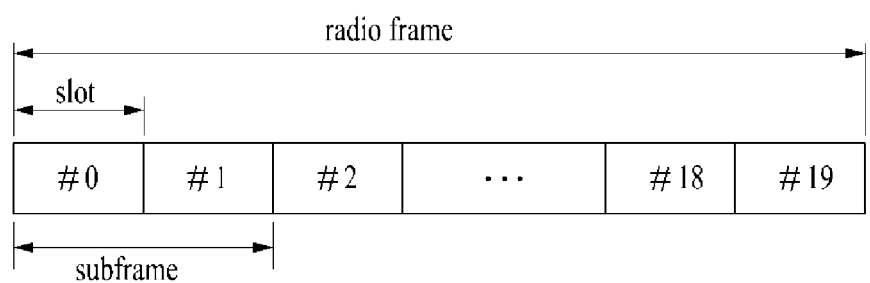
FIG. 1 illustrates the structure of a radio frame used in a 3GPP LTE system.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term fixed station, Node B, eNode B (eNB), ABS (Advanced Base Station), access point, etc. Furthermore, the term 'BS' may include a cell or a sector. The term 'relay node (RN)' may be replaced with the term relay station (RS). The term UE may be replaced with the terms MS (Mobile Station), SS (Subscriber Station), MSS (Mobile Subscriber Station), AMS (Advanced Mobile Station), mobile terminal, etc.

Specific terms used for the embodiments of the present invention are provided to aid in the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention are supported by standard documents disclosed for at least one of wireless access systems including IEEE 802 systems, a 3GPP system, 3GPP LTE and LTE-Advanced (LTE-A) systems, and a 3GPP2 system. The steps or parts, which are not described to clearly reveal the technical idea of the present invention, in the embodiments of the present invention may be supported by the above documents. All terms used in the embodiments of the present invention may be explained by the standard documents.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access). CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA). UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. WiMAX can be explained by IEEE 802.16e (WirelessMAN-OFDMA Reference System) and advanced IEEE 802.16m (WirelessMAN-OFDMA Advanced System). The following embodiments of the present invention mainly describe examples of the technical characteristics of the present invention as applied to 3GPP LTE/LTE-A systems. However, this is merely exemplary and the present invention can be applied to IEEE 802.16e/m systems.

FIG. 1 illustrates a radio frame structure in the 3GPP LTE system. A radio frame is divided into 10 subframes. Each subframe is further divided into two slots in the time domain. A unit time in which one subframe is transmitted is defined as a Transmission Time Interval (TTI). For example, one subframe may be 1 ms in duration and one slot may be 0.5 ms in duration. A slot may include a plurality of Orthogonal Frequency Division Multiplexing (OFDM) symbols in the time domain. Because the 3GPP LTE system adopts OFDMA for downlink, an OFDM symbol represents one symbol interval. A symbol may be referred to as an SC-FDMA symbol or symbol interval on the uplink. A Resource Block (RB) is a resource allocation unit including a plurality of consecutive subcarriers in a slot. This radio frame structure is purely exemplary and thus the number of subframes in a radio frame, the number of slots in a subframe, or the number of OFDM symbols in a slot may vary.

Figure 2:
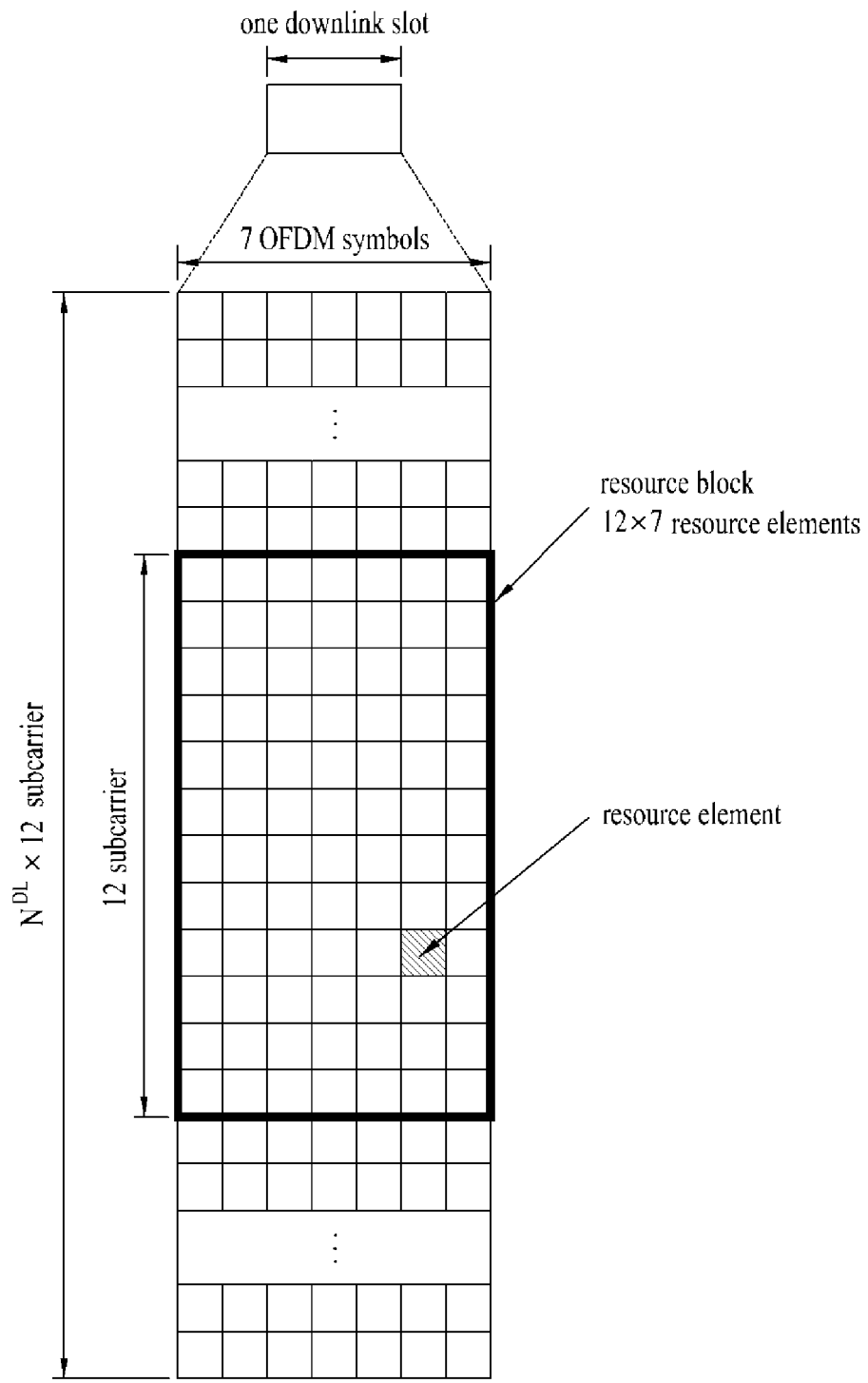
FIG. 2 illustrates a resource grid in a downlink slot.

FIG. 2 illustrates a resource grid in a downlink slot. A downlink slot has 7 OFDM symbols in the time domain and an RB includes 12 subcarriers in the frequency domain, which does not limit the scope and spirit of the present invention. For example, a downlink slot includes 7 OFDM symbols in a subframe with a normal Cyclic Prefix (CP), whereas a downlink slot includes 6 OFDM symbols in a subframe with an extended CP. Each element of the resource grid is referred to as a Resource Element (RE). An RB includes 12×7 REs. The number of RBs in a downlink slot, $N^{DL}$, depends on a downlink transmission bandwidth. An uplink slot may have the same structure as a downlink slot.

Figure 3:
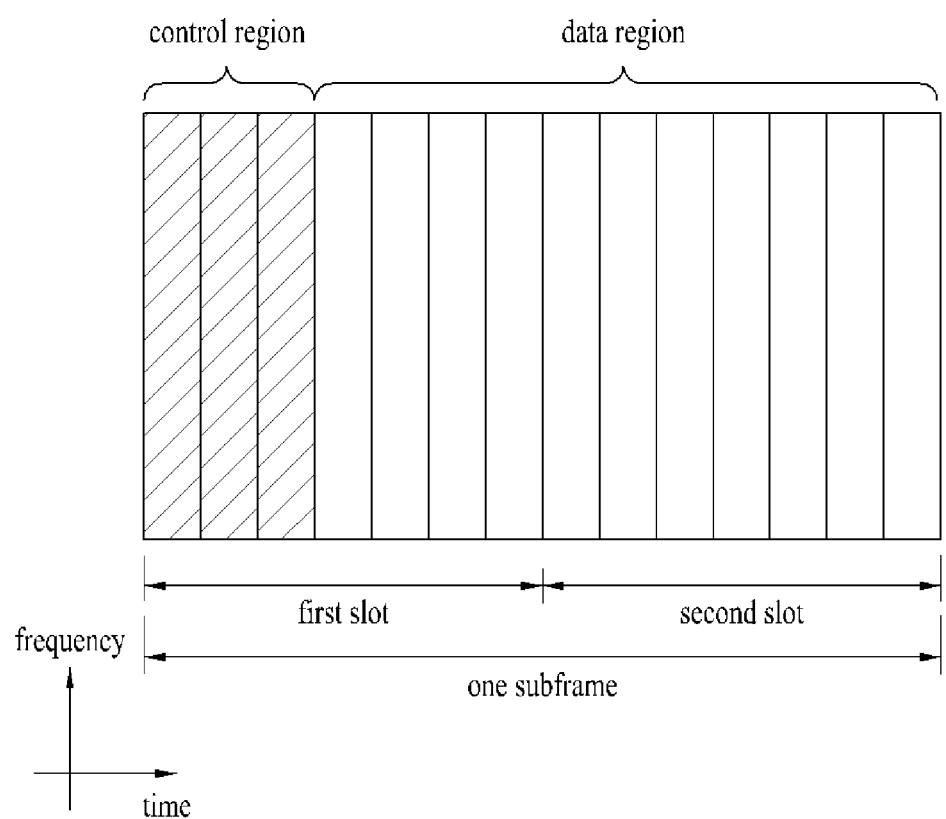
FIG. 3 illustrates the structure of a downlink subframe.

FIG. 3 illustrates a downlink subframe structure. Referring to FIG. 3, up to three OFDM symbols at the start of the first slot in a downlink subframe are used for a control region to which control channels are allocated and the other OFDM symbols of the downlink subframe are used for a data region to which a Physical Downlink Shared CHannel (PDSCH) is allocated. Downlink control channels used in the 3GPP LTE system include a Physical Control Format Indicator CHannel (PCFICH), a Physical Downlink Control CHannel (PDCCH), and a Physical Hybrid automatic repeat request (ARQ) Indicator CHannel (PHICH). The PCFICH is located in the first OFDM symbol of a subframe, carrying information about the number of OFDM symbols used for transmission of control channels in the subframe. The PHICH delivers a HARQ ACKnowledgment/Negative ACKnowledgment (ACK/NACK) signal as a response to an uplink transmission. Control information carried on the PDCCH is called Downlink Control Information (DCI). The DCI includes uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a random access response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a set of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH carries information about a specific UE, the CRC of the PDCCH may be masked by a cell-RNTI (C-RNTI) of the UE. If the PDCCH carries a paging message, the CRC of the PDCCH may be masked by a paging indicator identifier. If the PDCCH carries system information, particularly, a System Information Block (SIB), its CRC may be masked by a system information ID and a System Information RNTI (SI-RNTI). To indicate that the PDCCH carries a random access response to a random access preamble transmitted by a UE, its CRC may be masked by a Random Access-RNTI (RA-RNTI).

Figure 4:
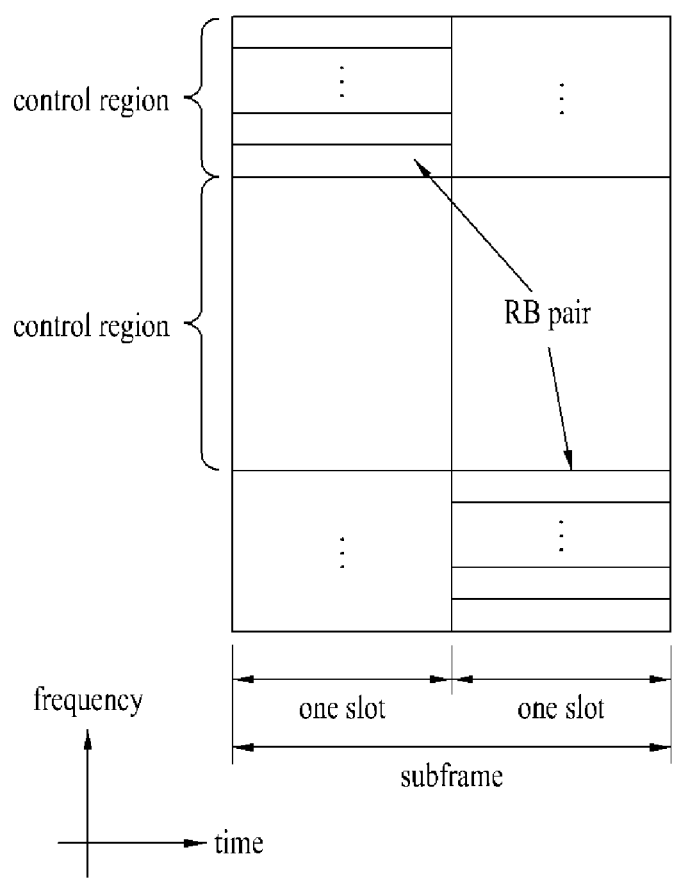
FIG. 4 illustrates the structure of a downlink subframe.

FIG. 4 illustrates an uplink subframe structure. An uplink subframe may be divided into a control region and a data region in the frequency domain. A Physical Uplink Control CHannel (PUCCH) carrying uplink control information is allocated to the control region and a Physical Uplink Shared CHannel (PUSCH) carrying user data is allocated to the data region. To maintain single-carrier characteristics, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Carrier Aggregation

Carrier Aggregation (CA) will now be described. Carrier aggregation considered for introduction to advanced OFDM mobile communication systems is a technology that transmits data or control information through one or more carriers (which may be referred to as component carriers or carrier bands), individually assigned for a downlink and an uplink, simultaneously by a downlink transmitting part (eNB (cell) or relay node) or by an uplink transmitting part (UE or relay node). In the following description, an uplink component carrier is referred to as a UL CC and a downlink component is referred to as a DL CC. A carrier or a component carrier may be represented as a cell according to description and representation of functions in 3GPP standard. Accordingly, a DL CC can be represented as a DL cell and an UL Cc can be represented as a UL cell. Although the term carrier or component carrier is used for embodiments of the present invention, it may be replaced with the cell in the following description.

Furthermore, while an eNB (or cell) is used as a downlink transmitting part and a UE is used as an uplink transmitting part in the following description, the present invention is not limited thereto. That is, the present invention can be applied to a case in which a relay node is used as a downlink transmitter for transmitting signals to a UE or as an uplink receiver for receiving signals at the UE, or the relay node is used as an uplink transmitter for transmitting signals to an eNB or as a downlink receiver for receiving signals from the eNB.

Downlink CA may be described as support of an eNB's downlink transmission to a UE using frequency resources (subcarriers or Physical Resource Blocks (PRBs)) of one or more carrier bands in time resources (allocated in units of a subframe). Uplink CA may be described as support of UE uplink transmission to an eNB using frequency resources (subcarriers or PRBs) of one or more carrier bands in time resources (allocated in units of a subframe).

Figure 5:
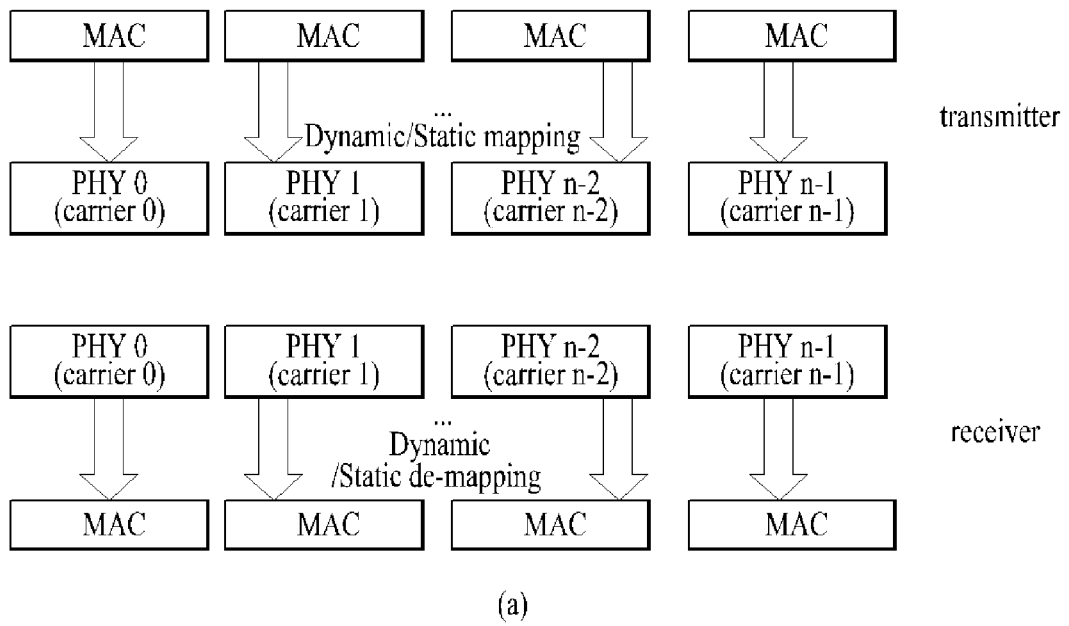
FIG. 5 is a view referred to for describing configurations of a physical layer L1 and a MAC layer L2 in a multi-carrier system.
Figure 5:
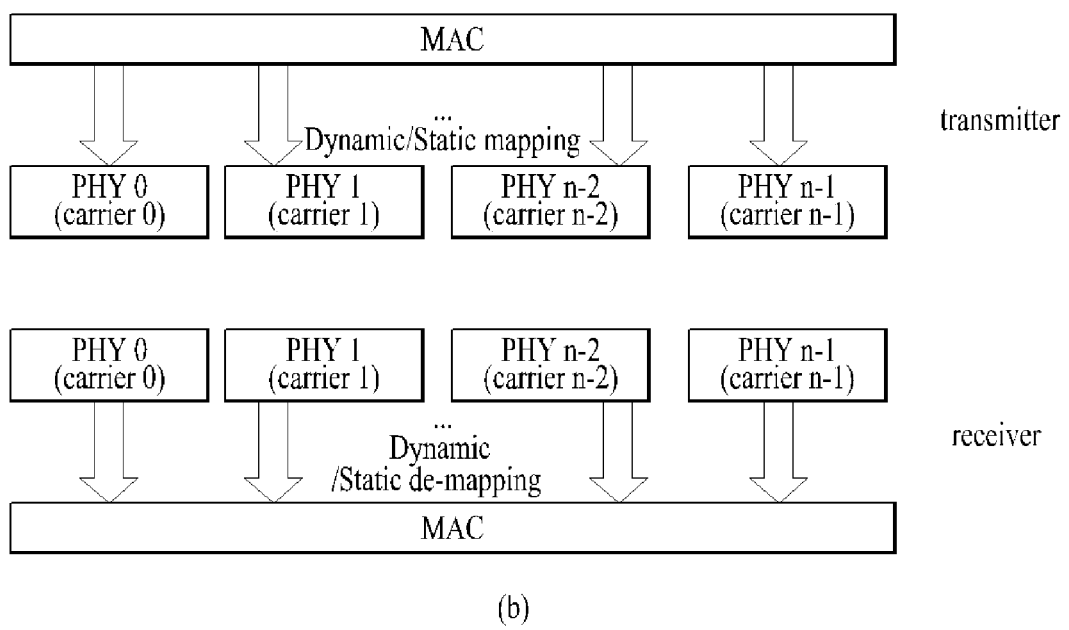

With reference to FIG. 5, the structures of a PHYsical (PHY) layer (Layer 1, L1) and a Medium Access Control (MAC) layer (Layer 2, L2) in a multi-carrier system will be described below. In a legacy single-carrier wireless communication system, an eNode B may have one PHY entity that supports one carrier and one MAC entity that controls the PHY entity. For example, the PHY layer may perform a baseband processing operation. The MAC layer may generate a MAC Protocol Data Unit (PDU) and perform an L1/L2 scheduling operation covering a MAC/RLC sublayer, for example, at a transmitter. A MAC PDU packet block of the MAC layer is converted into a transport block at a logical transport layer and then mapped to an input information block of the PHY layer. The MAC layer is illustrated in FIG. 5 such that it corresponds to all L2 layers so as to cover MAC/RLC/PDCP sublayers. This may be applied to description of the MAC layer for embodiments of the present invention.

Meanwhile, there may be a plurality of MAC-PHY entities in a multi-carrier system. That is, a transmitter and a receiver may be configured in such a manner that MAC-PHY entities are mapped to n CCs in one-to-one correspondence, as illustrated in FIG. 5(a). Because independent PHY and MAC layers are configured for each CC, a PDSCH is generated from a MAC PDU on a CC basis at the PHY layer.

Alternatively, one common MAC entity and a plurality of PHY entities may be configured in the multi-carrier system. That is, as illustrated in FIG. 5(b), a transmitter and a receiver may be configured in the multi-carrier system in such a manner that n PHY entities are mapped to n CCs in one-to-one correspondence and a single common MAC entity controls the n PHY entities. In this case, a MAC PDU of the single MAC layer may be branched into a plurality of transport blocks corresponding one to one to a plurality of CCs at the transport layer. Or when the MAC layer or the RLC layer generates a MAC PDU or an RLC PDU, the MAC PDU or the RLC PDU may be branched for the respective CCs. Consequently, a PDSCH is generated for each CC at the PHY layer.

A PDCCH carrying control information of L1/L2 control signaling generated from the packet scheduler of the MAC layer may be mapped to and transmitted in physical resources for each individual CC. PDCCHs carrying control information for transmission of a PDSCH to a specific UE or for transmission of a PUSCH from the specific UE (channel assignment PDCCHs or DL/UL grant PDCCHs) may be encoded separately for respective CCs each carrying a PDSCH/PUSCH. These PDCCHs may be referred to as separately coded PDCCHs. Meanwhile, control information for PDSCH/PUSCH transmission on a plurality of CCs may be configured into a single PDCCH, for transmission. This PDCCH may be referred to as a jointly coded PDCCH.

To support CA, a connection needs to be established or a connection setup needs to be prepared between an eNode B and a UE (or an RN) in order to transmit a control channel (PDCCH or PUCCH) and/or a shared channel (PDSCH or PUSCH). For the connection/connection setup, a specific UE (or RN) needs to measure carriers and/or report the carrier measurements and thus CCs to be measured and/or reported may be assigned to the UE (or RN). That is, CC assignment is the process of configuring CCs (setting the number and indexes of CCs) for use in downlink/uplink transmission to/from a specific UE (or RN) from among downlink/uplink CCs configured by an eNode B, taking into account the capabilities of the specific UE (or RN) and a system environment.

If the Radio Resource Management (RRM) layer at L3 controls CC assignment, the CC assignment may be signaled by UE-specific, RN-specific, cell-specific, or cell cluster-specific RRC signaling. When CC assignment needs to be controlled dynamically, the CC assignment may be signaled by L1/L2 control signaling on a specific PDCCH, a dedicated physical control channel, or a PDSCH taking the form of an L2 MAC message. Meanwhile, if the packet scheduler controls CC assignment, the CC assignment may be signaled the CC assignment by L1/L2 control signaling on a specific PDCCH, a dedicated physical control channel, or a PDSCH taking the form of an L2 MAC message.

Figure 6:
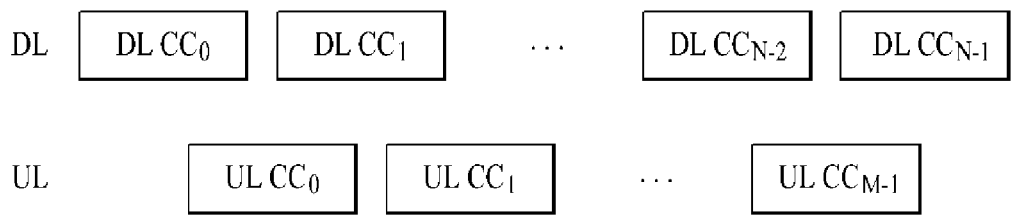
FIG. 6 is a conceptual view illustrating component carriers (CCs) for a downlink and an uplink.

FIG. 6 is a conceptual diagram illustrating component carriers (CCs) assigned to a downlink and an uplink. In FIG. 6, DL CCs and UL CCs can be allocated by an eNB (cell) or a relay node. For example, the number of DL CCs may be set to N and the number of UL CCs may be set to M.

After RRC connection (cell search, system information acquisition/reception, initial random access, etc.) on the basis of a single CC for each of a DL and a UL is established through initial access or initial deployment of a UE, an eNB can signal carrier configuration for each UE through dedicated signaling (UE-specific RRC signaling or UE-specific L1/L2 PDCCH signaling). If carrier configuration is commonly established for UEs corresponding to each eNB (cell or cell cluster), the carrier configuration may be signaled through cell-specific RRC signaling or cell-specific UE-common L1/L2 PDCCH signaling. Otherwise, carrier configuration information configured by an eNB may be signaled to a UE through system information for RRC connection, or signaled to the UE through system information or cell-specific RRC signaling after RRC connection is established.

While DL/UL CC configuration is described on the basis of the relationship between an eNB and a UE in the specification, the present invention is not limited thereto. For example, a relay node can signal DL/UL CC configuration for a UE in the area of the relay node to the UE. Furthermore, an eNB can signal DL/UL CC configuration for a relay node in the area of the eNB to the relay node. Although DL/UL CC configuration is described on the basis of the relationship between an eNB and a UE in the following description for clarity, the DL/UL CC configuration can be applied between a relay node and a UE (access uplink and downlink) or between an eNB and a relay node (backhaul uplink and downlink).

DL/UL CC connection may be implicitly set during a procedure of assigning DL/UL CCs for individual UEs, or explicitly set through definition of a signaling parameter.

Figure 7:
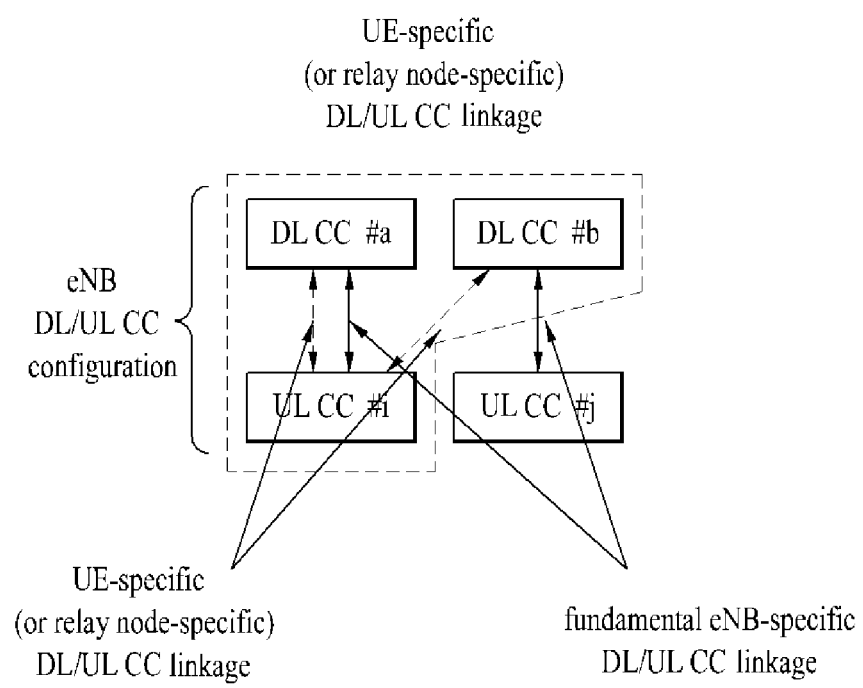
FIG. 7 illustrates an example of linkage of DL/UL CCs.

FIG. 7 illustrates an example of DL/UL CC linkage. FIG. 7 shows DL/UL CC linkage defined when 2 DL CCs (DL CC #a and DL CC #b) and one UL CC (UL CC #i) are assigned to a UE in a case that an eNB configures CCs with 2 DL CCs (DL CC #a and DL CC #b) and 2 UL CCs (UL CC #i and UL CC #j). In FIG. 7, a solid line arrow indicates linkage of a DL CC and a UL CC configured by the eNB, which can be defined in SIB 2. A dotted line arrow indicates linkage of a DL CC and a UL CC configured for a specific UE. DL/UL CC linkage illustrated in FIG. 7 is exemplary and the present invention is not limited thereto. That is, the number of DL CCs and UL CCs configured by an eNB may be set to an arbitrary value, and thus the number of UE-specifically set or allocated DL CCs and UL CCs from among the DL CCs and UL CCs configured by the eNB may be set to an arbitrary value in various embodiments of the present invention. In addition, DL/UL CC linkage may be defined by a method different from that illustrated in FIG. 7.

A primary CC (PCC) (or primary cell (P-cell)) or an anchor CC (or anchor cell) may be set from among DL CCs and UL CCs configured or allocated for a UE for a specific purpose. For example, a DL PCC (or DL P-cell) can be set for transmission of configuration/reconfiguration information for RRC connection. As another example, a UL PCC (or UL P-cell) can be set as a UL CC carrying a PUCCH for transmitting UCI that needs to be transmitted by a UE through an uplink. One DL PCC (P-cell) and one UL PCC (P-cell) are UE-specifically configured for each UE, basically. If a large number of CCs are allocated to a UE or CCs are configured by a plurality of eNBs, one or more eNBs may configure one or more DL PCCs (P-cells) and/or UL PCCs (P-cells) for a UE. Linkage of a DL PCC (P-cell) and a UL PCC (P-cell) may be UE-specifically established by an eNB. Alternatively, linkage of a DL PCC (P-cell) and a UL PCC (P-cell) may be made on the basis of basic linkage signaled through SIB 2 defined in LTE release-8 (Rel-8) for simplification of the linkage. The linked DL PCC (P-cell) and UL PCC (P-cell) may be referred to as a UE-specific P-cell.

SC-FDMA Transmission and OFDMA Transmission

Figure 8:
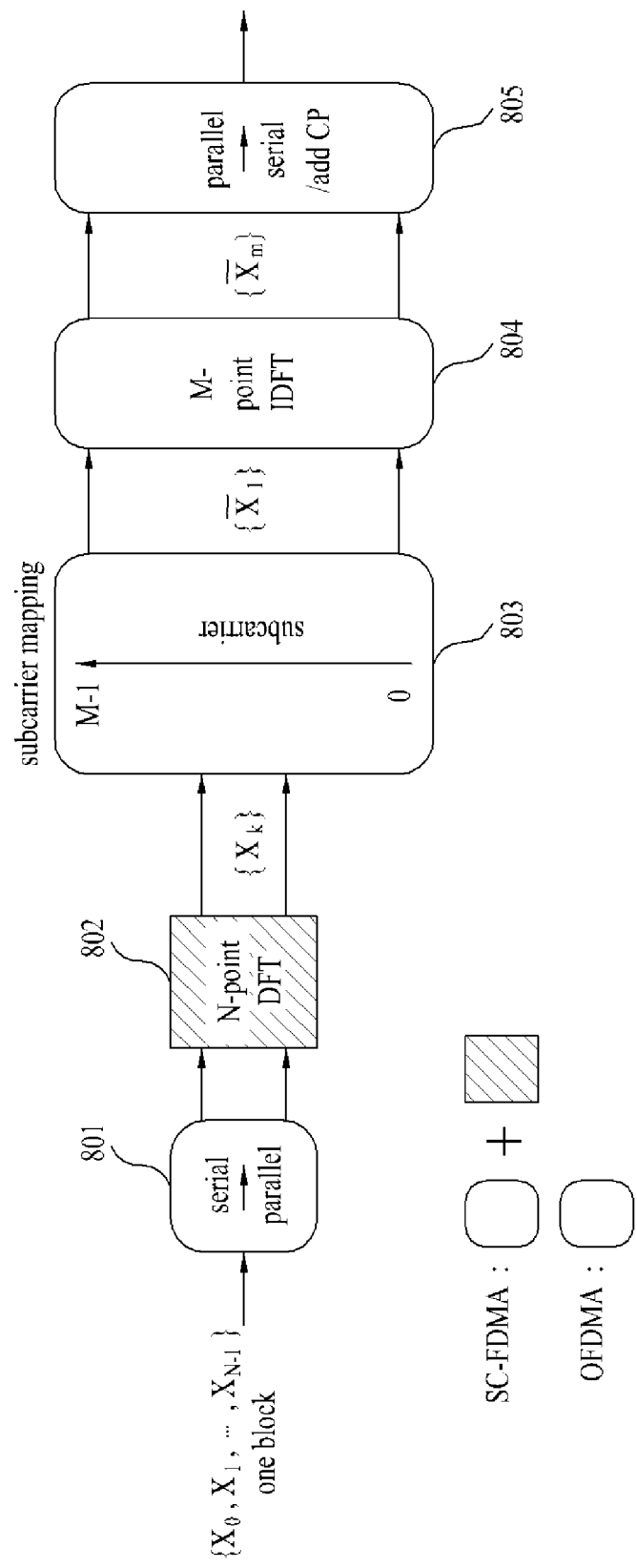
FIG. 8 is a view referred to for describing an SC-FDMA transmission scheme and an OFDMA transmission scheme.

FIG. 8 is a view referred to for describing SC-FDMA and OFDMA in a mobile communication system. The SC-FDMA can be used for uplink transmission and the OFDMA can be used for downlink transmission.

Each of an uplink signal transmitting part (e.g. a UE) and a downlink signal transmitting part (e.g. an eNB) includes a serial-to-parallel converter 801, a subcarrier mapper 803, an M-point IDFT (Inverse Discrete Fourier Transform) module 804, and a parallel-to serial converter 805. Channel-coded and modulated data symbols are input to the serial-to-parallel converter 801. A UE for transmitting signals using SC-FDMA can additionally include an N-point DFT (Discrete Fourier Transform) module 802 to partially offset the influence of IDFT executed by the M-point IDFT module 804 such that a transmission signal has single-carrier characteristics. That is, the DFT module 802 can satisfy single-carrier characteristics required for uplink transmission by DFT-spreading input data symbols. This SC-FDMA can provide satisfactory PAPR (Peak to Average Power Ratio) or CM (Cubic Metric) such that an uplink transmitter can transmit signals more efficiently even under a power restriction condition to thereby improve user throughput.

Figure 9:
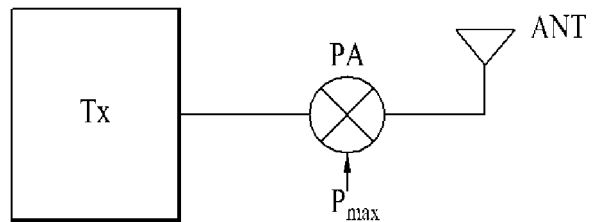
FIG. 9 is a view referred to for describing maximum transmit power in single antenna transmission and multi-antenna transmission.
Figure 9:
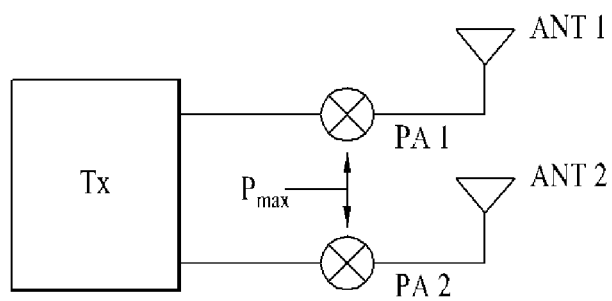
Figure 9:
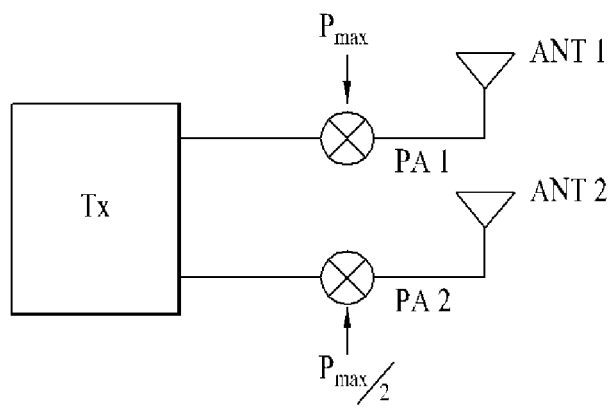

FIG. 9 is a view referred to for describing maximum transmit power in single antenna transmission and multi-antenna transmission. FIG. 9(*a*) illustrates single antenna transmission. Referring to FIG. 9(*a*), one power amplifier (PA) may be provided per antenna. The output $P_{max}$ of the PA may be a specific value, for example, 23 dBm. FIGS. 9(*b*) and 9(*c*) illustrate multi-antenna transmission. Referring to FIGS. 9(*b*) and 9(*c*), a plurality of PAs may be respectively mapped to a plurality of transport antennas. For example, 2 PAs can be respectively mapped to 2 transport antennas. The outputs (i.e., maximum transmit powers) of the 2 PAs may be different from each other as shown in FIGS. 9(b) and 9(c).

In FIG. 9(b), in single antenna transmission, a maximum transmit power value $P_{max}$ is provided by power amplifiers PA1 and PA2. That is, if a transmit power value is x dBm, the power amplifier PA2 can output a transmit power value of $(P_{max}-x)$dBm. In this case, the overall transmit power is maintained as $P_{max}$, and thus a transmitter can have characteristics more robust against a PAPR increases in a power restriction condition.

FIG. 9(c) shows that only one antenna ANT1 has the maximum transmit power value $P_{max}$ and the transmit power of the other antenna ANT2 is set to $P_{max}/2$. In this case, only one antenna can be robust against a PAPR.

MIMO Transmission

MIMO (Multi-Input Multi-Output) technology increases data transmission/reception efficiency using a plurality of transmit antennas and a plurality of receive antennas. That is, MIMO is a scheme of increasing transmission capacity or improving performance using a plurality of antennas at a transmitter or a receiver. In the specification, MIMO is referred to as a multi-antenna scheme.

The multi-antenna scheme is an application of putting data segments received from a plurality of antennas into a whole message, without depending on a single antenna path to receive the whole message. This multi-antenna scheme is a next-generation mobile communication technology which can be widely used for mobile communication terminals and relay nodes because it can raise a data transmission rate in a specific range or increase system range for a specific data transmission rate. The multi-antenna scheme attracts attention as a technology capable of overcoming the limitations of mobile communication transmission capacity due to data communication expansion.

FIG. 10(a) illustrates the configuration of a wireless communication system supporting multiple antennas. Referring to FIG. 10(a), when the number of Transmission (Tx) antennas and the number of Reception (Rx) antennas are increased to $N_T$ and $N_R$, respectively at both a transmitter and a receiver, theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate $R_o$ that may be achieved in case of a single antenna and a rate increase rate $R_i$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was proven in the mid 1990's, many techniques have been actively studied to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway into many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Figure 10:
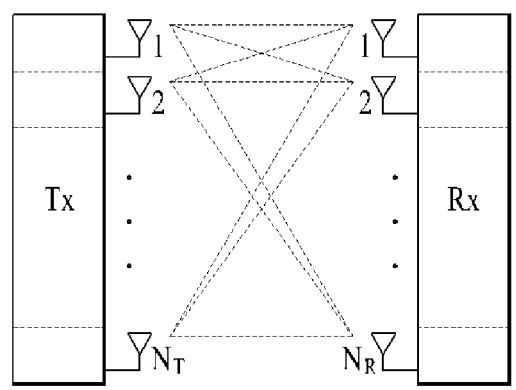
FIG. 10 illustrates a configuration of a MIMO communication system.
Figure 10:
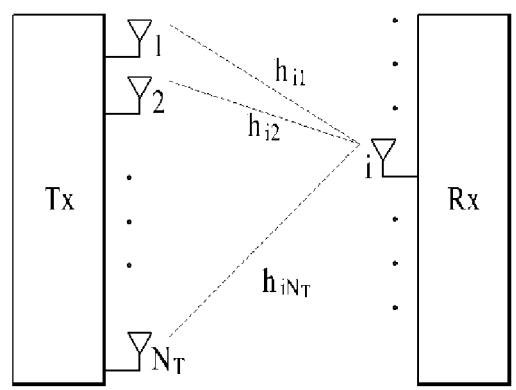

Communication in a MIMO system with $N_T$ Tx antennas and $N_R$ Rx antennas will be described in detail through mathematical modeling. Assuming that $N_T$ Tx antennas and $N_R$ Rx antennas are presented, as illustrated in FIG. 10(1). Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmit power levels of the transmission information be denoted by $P_1, P_2, \ldots, P_{N_T}$, respectively. Then the transmission power-controlled transmission information vector may be given as;

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ may be represented as a vector x, which may be determined by Equation 5 wherein $w_{ij}$ denotes a weight between a $j^{th}$ piece of information and an $i^{th}$ Tx antenna and W is a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Given $N_R$ Rx antennas, signals received at the Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO wireless communication system, they may be distinguished according to the indexes of Tx and Rx antennas. A channel between a $j^{th}$ Tx antenna and an $i^{th}$ Rx antenna is denoted by $h_{ij}$. Notably, the index of an Rx antenna precedes the index of a Tx antenna in $h_{ij}$.

The channels may be collectively represented as a vector or a matrix. FIG. 10(b) illustrates channels from $N_T$ Tx antennas to an $i^{th}$ Rx antenna.

Referring to FIG. 10(b), the channels from the $N_T$ Tx antennas to the $i^{th}$ Rx antenna may be expressed as;

$$h_i^T = [h_{i1}, h_{i2}, \ldots, h_{iN_T}] \quad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

Actual channels experience the above channel matrix H and then Additive White Gaussian Noise (AWGN) is added thereto. The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above mathematical modeling, the received signal vector is given as;

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The numbers of rows and columns in the channel matrix H representing channel states are determined according to the numbers of Rx and Tx antennas. Specifically, the number of rows in the channel matrix H is equal to the number of Rx antennas, $N_R$ and the number of columns in the channel matrix H is equal to the number of Tx antennas, $N_T$. Hence, the channel matrix H is of size $N_R \times N_T$. The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \quad \text{[Equation 11]}$$

The MIMO scheme used for operation of the MIMO system may include FSTD (Frequency Switched Transmit Diversity), SFBC (Space Frequency Block Code), STBC (Space Time Block Code), CDD (Cyclic Delay Diversity), TSTD (Time Switched Transmit Diversity), etc. For rank 2 or higher, SM (Spatial Multiplexing), GCDD (Generalized Cyclic Delay Diversity), S-VAP (Selective Virtual Antenna Permutation), etc. can be used.

FSTD obtains a diversity gain by allocating subcarriers having different frequencies to signals transmitted through a plurality of antennas. SFBC is a scheme that can secure both a diversity gain and a multi-UE scheduling gain in a corresponding dimension by efficiently applying selectivity in the spatial domain and frequency domain. CDD obtains a diversity gain using a path delay between Tx antennas. TSTD distinguishes signals transmitted through a plurality of antennas according to time. SM transmits different pieces of data through antennas respectively to thereby increase transmission rate. GCDD is a scheme of applying selectivity in the time domain and frequency domain. S-VAP uses a single precoding matrix classified into MCW (Multi-CodeWord) S-VAP that mixes a plurality of codewords between antennas in spatial diversity or spatial multiplexing and SCW (Single CodeWord) S-VAP using a single codeword.

Among the above-mentioned MIMO schemes, STBC repeats the same data symbol such that the data symbol supports orthogonality in the time domain to obtain time diversity. Similarly, SFBC repeats the same data symbol such that the data symbol supports orthogonality in the frequency domain to obtain frequency diversity. A time block code used for STBC and a frequency block code used for SFBC are represented by the following mathematical expressions. The first expression represents a block code in case of 2 Tx antennas and the second expression represents a block code in case of 4 Tx antennas.

$$\frac{1}{\sqrt{2}} \begin{pmatrix} S_1 & S_2 \\ -S_2^* & S_1^* \end{pmatrix} \quad \text{[Mathematical expression 1]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Mathematical expression 2]}$$

Here, $S_i$ (i=1, 2, 3, 4) denotes a modulated data symbol. Rows of the matrices represent antenna ports and columns thereof represent time (in case of STBC) or frequencies (in case of SFBC).

Figure 11:
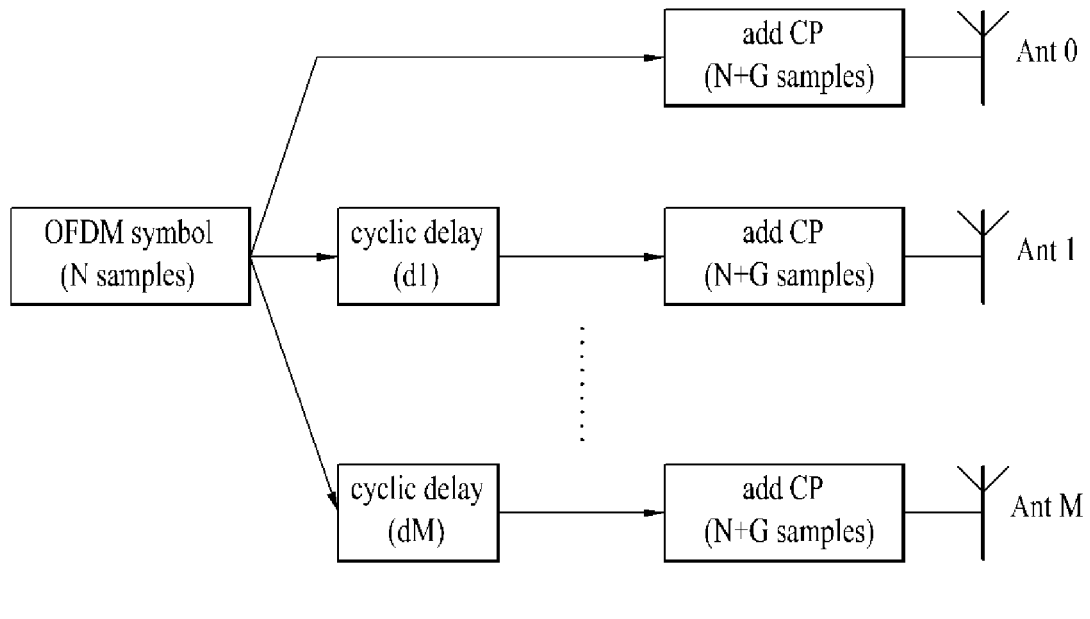
FIG. 11 illustrates a general CDD structure in a MIMO system.
Figure 11:
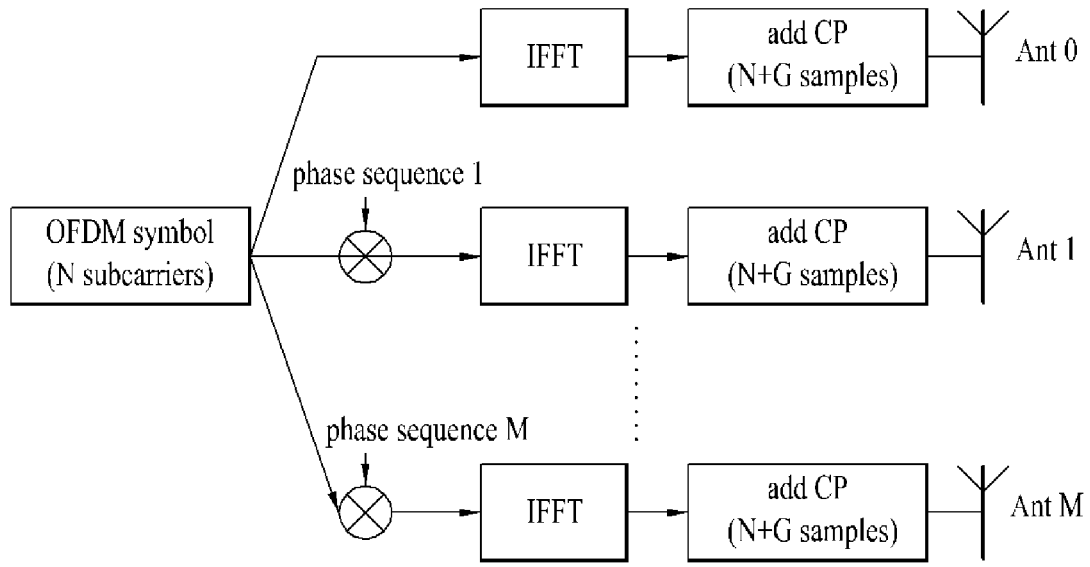

Among the above-mentioned MIMO transmission schemes, CDD increases frequency diversity by artificially enhancing delay spread. FIG. 11 illustrates an exemplary CDD in a MIMO system. FIG. 11(a) illustrates a scheme of using cyclic delay in the time domain and FIG. 11(b) illustrates a scheme of employing phase-shift in the frequency domain.

Figure 12:
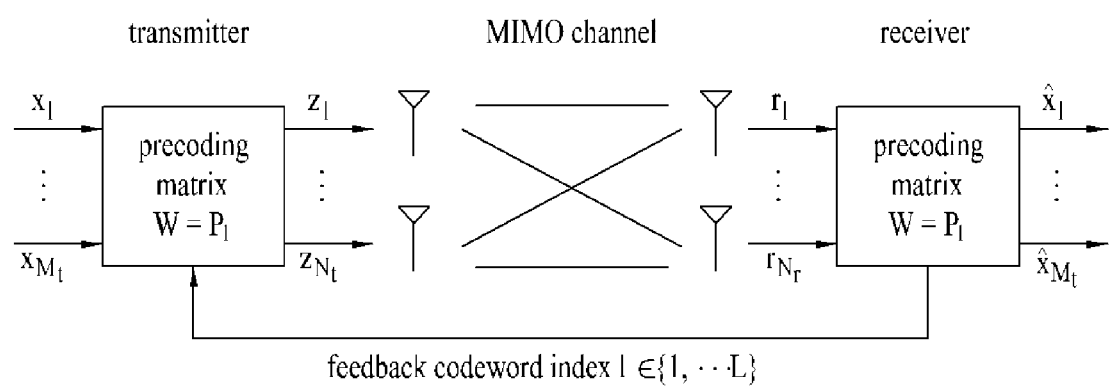
FIG. 12 is a view referred to for describing codebook based precoding.

A codebook-based precoding technique will now be described in association with the aforementioned MIMO transmission schemes. FIG. 12 is a view referred to for describing the fundamental concept of codebook-based precoding.

In the codebook-based precoding scheme, a transmitter and a receiver share codebook information including a predetermined number of precoding matrixes according to transmission rank, the number of antennas, etc. The receiver can measure a channel state through a received signal to feed back information on a preferred precoding matrix to the transmitter on the basis of the codebook information. While FIG. 12 illustrates that the receiver transmits information on a preferred precoding matrix to the transmitter for each codeword, the present invention is not limited thereto.

Upon reception of the feedback information from the receiver, the transmitter can select a specific precoding matrix from the codebook on the basis of the received information. The transmitter can perform precoding in such a manner that the selected precoding matrix is multiplied by layer signals corresponding to the transmission rank and transmit precoded transmission signals through a plurality of antennas. Upon reception of the signals precoded and transmitted by the transmitter, the receiver can restore the received signals by performing inverse processing of the precoding carried out by the transmitter on the received signals. Because a precoding matrix satisfies unitary matrix (U) conditions such as $U*U^H=I$, the inverse of precoding can be performed in such a manner that the received signals are multiplied by a Hermitian matrix $P^H$ of the precoding matrix used for the precoding performed by the transmitter.

When the above-mentioned CA is employed, a plurality of CCs can be configured for data and control information transmission on an uplink and a downlink for a UE.

Meanwhile, downlink and uplink transmitters can have the capability to perform transmission using one or more antennas (the aforementioned MIMO transmission schemes including single antenna transmission) and various MIMO transmission techniques and adaptation schemes associated with the MIMO transmission techniques can be applied. For example, mode adaptation between MIMO transmission modes, AMC (Adaptive Modulation and Coding) (represented as MCS (Modulation and coding Scheme) based on CQI (Channel Quality Information)) as a link adaptation scheme in a transmission mode, adaptation of rank (the number of streams in spatial multiplexing) in a transmission mode to which precoding is applied, adaptive precoding (encoding using a precoder represented by PMI (Precoding Matrix Index)), etc. can be applied in order to improve system yield in response to channel states.

The above-mentioned CA and MIMO can be implemented in a linked manner in downlink or uplink transmission. At this time, different MIMO transmission modes can be set carrier-specifically (that is, for respective CCs). When a MIMO transmission mode is set for each CC, it can be expected to improve system yield using channel-dependent scheduling. On the other hand, uplink/downlink data (PDSCH/PUSCH) transmission scheduling signaling may become complicated and overhead may be aggravated due to application of individual transmission modes to CCs.

Accordingly, a UE can detect uplink/downlink scheduling signaling on a downlink control channel through blind decoding.

Blind decoding is based upon hypotheses about various formats (PDCCH DCI format) of scheduling signaling and attempts to decode the scheduling signaling according to each hypothesis because the scheduling signaling may have different formats for MIMO transmission modes. If decoding according to a hypothesis is successful, uplink/downlink transmission can be performed according to the scheduling signal. However, if the decoding is not successful, decoding can be attempted according to another hypothesis for another format of the scheduling signaling. Consequently, the burden and complexity of the blind decoding increase as the number of formats of the scheduling signaling increases. Furthermore, feedback complexity of a UE also increases. Since allowable processing delay for scheduling signaling of a UE is less than 3 ms, the scheduling signaling may not be appropriately processed when the UE performs blind decoding for all hypotheses if the number of formats that the scheduling signaling can have exceeds a predetermined limit.

When different carrier bandwidths (or system bandwidths) are respectively allocated to DL CCs or UL CCs applied in case of CA, RA (Resource Assignment) field sizes in a DCI format may be different from one another. In addition, when different numbers of Tx antennas are respectively applied to DL CCs, precoding information for the DL CCs may have different sizes. In this case, DCI format sizes on a DL allocation PDCCH and a UL grant PDCCH for individual PDSCH and PUSCH may depend on attribute CCs carrying the PDSCH and PUSCH.

In view of this, the present invention proposes a variety of embodiments for effectively solving problems of overhead in downlink or uplink signaling (such as UE feedback and ACK/NACK transmission) and complexity of a transmitter or a receiver when a carrier-specific MIMO transmission mode is applied or different carrier bandwidths are assigned for individual carriers. Furthermore, the present invention suggests various embodiments for a case in which various DCI formats are used in a predetermined DL CC control region when a MIMO transmission mode is configured and signaled for each CC in case of CA. In addition, the present invention provides schemes for specifying and applying uplink/downlink scheduling signaling.

Scheme for Reducing UE PDCCH Blind Decoding Overhead in Application of Carrier-Specific MIMO Transmission Mode As to CA, it is possible to consider whether cross-carrier scheduling is applied or not. The cross-carrier scheduling means transmission of control information (DL channel allocation PDCCH), which schedules PDSCH transmission on DL CC #j, through a DL CC (DL CC #1) other than the DL CC #j, or transmission of control information (UL grant PDCCH), which schedules PUSCH transmission through UL CC #j, through a DL CC (DL CC #i) other than a DL CC (e.g. DL CC #j) associated with the UL CC #j. A case in which the DL allocation PDCCH for PDSCH transmission on DL CC #j is transmitted through DL CC #j, or the UL grant PDCCH for PUSCH transmission on UL CC #j is transmitted through DL CC #j associated with UL CC #j corresponds to a case in which cross-carrier scheduling is not applied.

Figure 13:
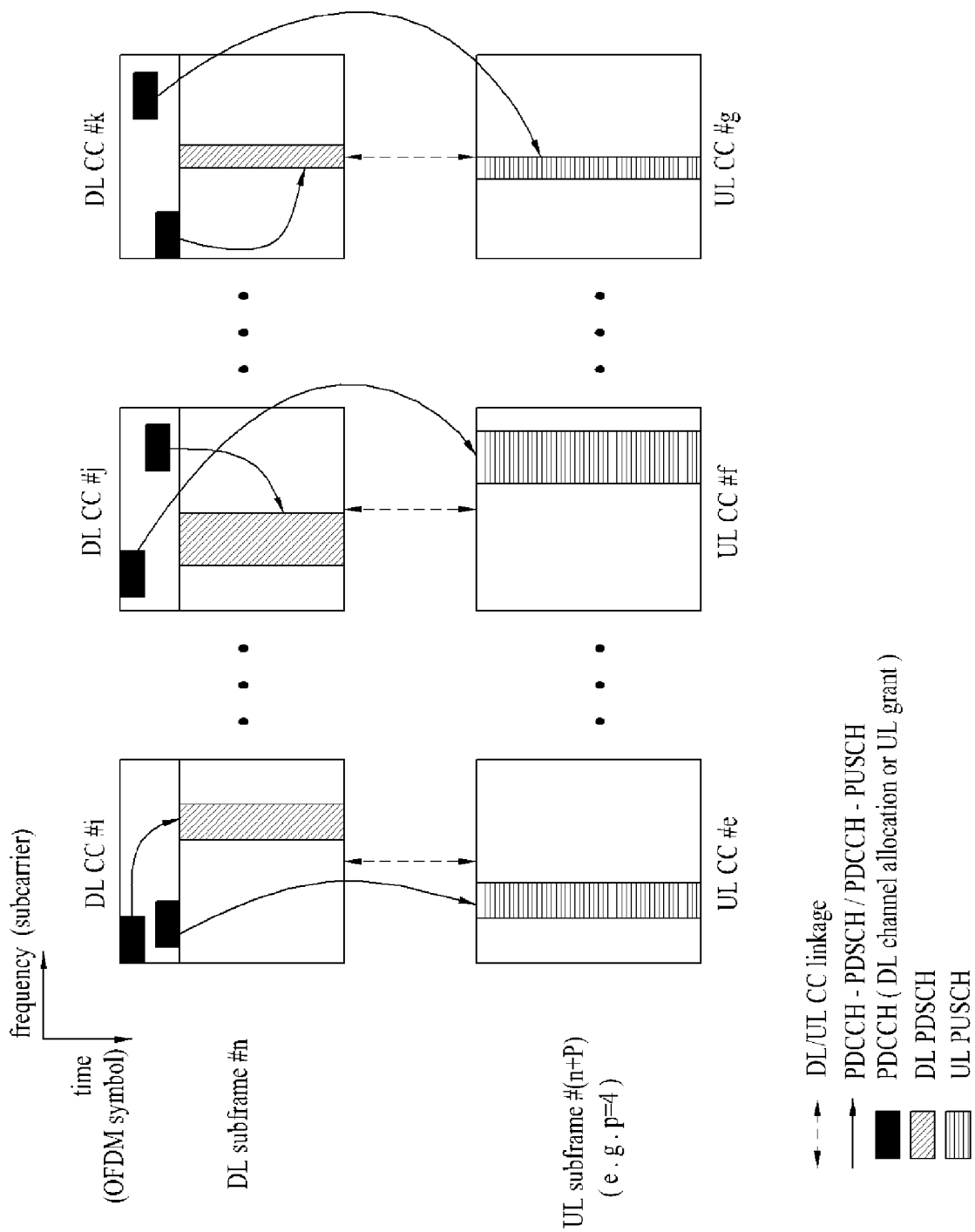
FIG. 13 is a view referred to for describing a case in which cross-carrier scheduling is not used.
Figure 14:
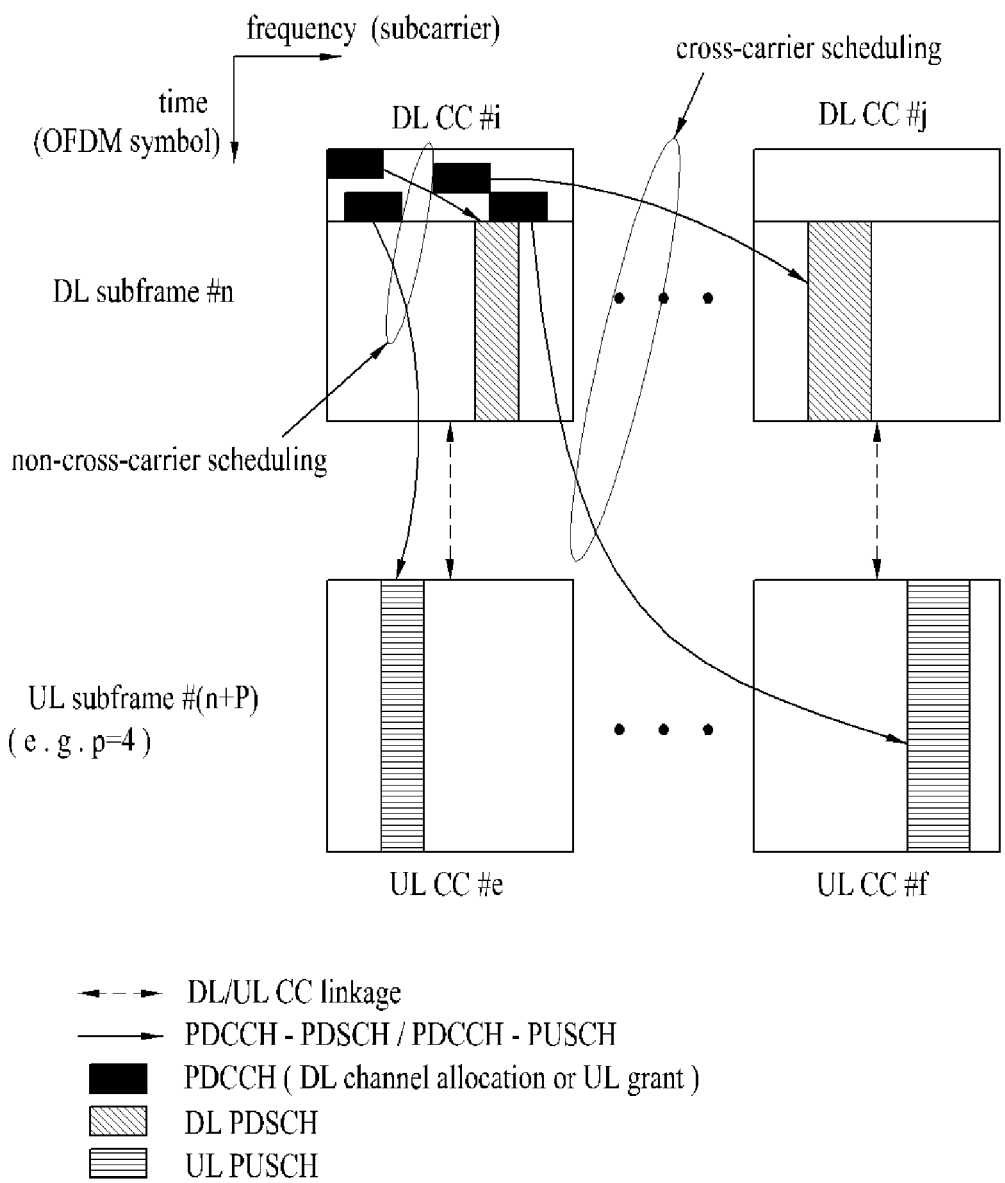
FIG. 14 is a view referred to for describing a case in which cross-carrier scheduling is used.

FIG. 13 is a view referred to for describing a case in which cross-carrier scheduling is not applied and FIG. 14 is a view referred to for describing a case in which cross-carrier scheduling is applied.

While FIGS. 13 and 14 illustrate a case in which the number of DL CCs and the number of UL CCs configured by an eNB (or a relay node as a downlink transmitter and an uplink receiver) are equal to each other, the present invention is not limited thereto. FIGS. 13 and 14 are conceptual views for describing cross-carrier scheduling, in which PDCCH, PDSCH and PUSCH positions on the time/frequency domains are exemplary. In addition, FIGS. 13 and 14 illustrate exemplary PDCCH positions in the time/frequency domains in the downlink control region and represent multiplexed PDCCHs, although the present invention is not limited thereto.

Referring to FIG. 13, when cross-carrier scheduling is not applied, a DL allocation PDCCH transmission DL CC corresponds to a PDSCH transmission DL CC, and a UL grant PDCCH transmission DL CC and a PUSCH transmission UL CC depend on DL/UL linkage configuration. For example, PDSCH transmission scheduling (DL channel allocation) on DL CC #i is provided through a PDCCH on the DL CC #i, and PUSCH transmission scheduling (UL grant) on UL CC #e is provided through a PDCCH on the DL CC #i linked with the UL CC #e. Similarly, PDSCH transmission on DL CC #j and PUSCH transmission on UL CC #f can be scheduled through a PDCCH (DL allocation or UL grant) on the DL CC #j according to linkage of the DL CC #j and UL CC #f. In addition, PDSCH transmission on DL CC #k and PUSCH transmission on UL CC #g can be scheduled through a PDCCH (DL allocation or UL grant) on the DL CC #k according to linkage of the DL CC #k and UL CC #g.

Referring to FIG. 14, when cross-carrier scheduling is applied, a DL allocation PDCCH transmission DL CC may differ from a PDSCH transmission DL CC, and a UL grant PDCCH transmission DL CC and a PUSCH transmission UL CC may not depend on DL/UL linkage configuration. For example, not only a DL allocation PDCCH that schedules PDSCH on DL CC #i or a UL grant PDCCH that schedules PUSCH transmission on UL CC #e is transmitted through a control region of the DL CC #i (which may be referred to as self-scheduling) but also a DL allocation PDCCH that schedules PDSCH transmission on DL CC #j or a UL grant PDCCH that schedules PUSCH transmission on UL CC #j can be multiplexed and transmitted through the control region of the DL CC #i.

Cross-carrier scheduling can be applied to a case in which a technique for remarkably reducing transmit power (soft silencing) for a specific DL CC or UL CC or making the transmit power zero (hard silencing), a case in which PDCCH frequency diversity needs to be secured when DL CCs or UL CCs having a narrow bandwidth are configured, a case in which a predetermined cell-specific or UE-specific primary carrier or anchor carrier is configured, or a case in which PDCCH blind decoding overheads of UEs need to be reduced.

In addition, cross-carrier scheduling may be set UE-specifically or commonly set for UEs in a cell (that is, cell-specifically). Cross-carrier scheduling may be set relay node-specifically or commonly set for relay nodes in a cell (that is, cell-specifically) when a relay node is considered to be a downlink receiver. In addition, cross-carrier scheduling may be set UE-specifically or commonly set for UEs in a relay node (relay node-specifically) when a relay node is considered as a downlink transmitter.

In other words, cross-carrier scheduling can be applied to DL allocation PDCCH or UL grant PDCCH transmission for PDSCH transmission on one or more DL CCs configured for a specific UE or PUSCH transmission on one or more UL CCs configured for the specific UE. Furthermore, cross-carrier scheduling can be applied to DL allocation PDCCH or UL grant PDCCH transmission for PDSCH transmission on one or more DL CCs configured for a specific cell or PUSCH transmission on one or more UL CCs configured for the specific cell. Moreover, cross-carrier scheduling can be applied to DL allocation PDCCH or UL grant PDCCH transmission for PDSCH transmission on one or more DL CCs configured for a specific relay node or PUSCH transmission on one or more UL CCs configured for the specific relay node.

In configuration and application of a DL/UL MIMO transmission mode for each CC (i.e., carrier-specifically) when cross-carrier scheduling is not employed, PDCCH blind decoding overhead/complexity of a downlink receiver (UE or relay node) may not increase when a scheduler or RRM (Radio Resource Management) of a downlink transmitter (eNB or relay node) configures the DL/UL transmission mode and signals the DL/UL transmission mode to the downlink receiver. This is because only a DL CC PDCCH for PDSCH transmission on a specific DL CC from among DL CCs configured for each downlink receiver (UE or relay node) and a UL grant PDCCH for PUSCH transmission on a UL CC linked with the specific DL CC are transmitted through a PDCCH resource region of the specific DL CC. In this case, the UE can perform scheduling signaling blind decoding to support backward compatibility.

When the number of DL CCs configured UE-specifically or cell-specifically is smaller than the number of UL CCs (UL CC-heavy assignment), a UL grant PDCCH for PUSCH transmission on a plurality of UL CCs may be transmitted through a specific DL CC. If different UL MIMO transmission modes are applied to the UL CCs, the UL grant PDCCH is transmitted in different DCI formats depending on the UL MIMO transmission modes, or the UL CCs have different carrier bandwidths, and thus an RA field size may be varied to change payload length. Accordingly, the downlink receiver (UE or relay node) may perform blind decoding for each of the different UL grant DCI formats.

When cross-carrier scheduling is employed and a DL or UL MIMO transmission mode is set for each CC, through a specific DL CC carrying a PDCCH, DL channel allocation PDCCHs for PDSCH transmission on a plurality of DL CCs can be multiplexed and transmitted to a specific downlink receiver (UE or relay node) through a specific DL CC carrying a PDCCH, and UL grant PDCCHs for PUSCH transmission on a plurality of UL CCs can be multiplexed and transmitted to the downlink receiver through the specific DL CC. At this time, if a MIMO transmission mode is carrier-specifically set for downlink PDSCH transmission (including PDCCH transmission as necessary) to the downlink receiver, or a MIMO transmission mode is carrier-specifically set for uplink PUSCH transmission from the downlink receiver, the downlink receiver needs to perform blind decoding for various DCI formats since the downlink receiver receives the DL channel allocation and/or UL grand PDCCHs through blind decoding. This causes overhead and complexity of blind decoding. In addition, as the payload length of a DL channel allocation or UL grant PDCCH is varied when a plurality of DL CCs carrying a PDSCH have different carrier bandwidths or a plurality of UL CCs carrying a PUSCH have different carrier bandwidths, overhead and complexity of PDCCH blind decoding of the downlink receiver increase.

That is, when different DCI formats of DL channel allocation PDCCH and UL grant PDCCH for PDSCH/PUSCH transmission are applied to carriers in a DL/UL transmission environment employing CA (for example, when different MIMO transmission modes are set for DL CCs or UL CCs, when different carrier bandwidths are set for DL CCs or UL CCs, etc.), if DL channel allocation PDCCHs or UL grant PDCCHs having different DCI formats are multiplexed and transmitted through a DL CC, overhead and complexity of PDCCH blind decoding of a downlink receiver (UE or relay node) that receives control information through the PDCCHs may increase. Even when the DL channel allocation PDCCHs or UL grant PDCCHs have the same DCI format, payload length may vary due to an RA field size difference, and thus the overhead and complexity of PDCCH blind decoding of the downlink receiver may increase. In the above-described CA for a UE, a region in which the UE blind-decodes a DL channel configuration PDCCH and/or a UL grant PDCCH having scheduling information about a PDSCH or PUSCH, a PDCCH search space can be individually defined for each DL CC transmitting the PDSCH, UL CCs transmitting the PUSCH, or DL CC/UL CC pairs based on linkage, to thereby prevent PDCCH blind decoding overhead and complexity from increasing exponentially.

A description will be given of various schemes proposed by the present invention for reducing PDCCH blind decoding overhead and complexity generated in the aforementioned cases. It is noted that the schemes can be applied to both a case in which scheduling PDCCHs for PDSCHs on a plurality of DL CCs or PUSCHs on a plurality of UL CCs in a PDCCH search space described above are multiplexed and a case in which a PDCCH search space is individually defined for each of DL CCs, UL CCs or linked DL CC/UL CC pairs in order to reduce PDCCH blind decoding overhead/complexity.

Scheme 1: Making Payload Lengths Corresponding to Scheduling PDCCH DCI Formats for MIMO Transmission Modes of Carriers Equal to One Another Bit padding using a bit 0 or an arbitrary value can be employed in order to make payload lengths corresponding to DCI formats of DL channel allocation PDCCHs for one or more MIMO transmission modes from among MIMO transmission modes applicable to downlink PDSCH transmission equal to one another. To achieve this, a MIMO transmission mode indicator can be defined and included in the DCI formats. The length of a downlink MIMO transmission mode indictor can be defined as a $\lceil \log_2 A \rceil$ bit. Here, A denotes the number of downlink MIMO transmission modes having the same payload length. Accordingly, the payload length applied to all the DCI formats can be defined as the sum of the MIMO transmission mode indicator and a DCI format payload length corresponding to a MIMO transmission mode that requires a maximum payload length from among various MIMO transmission modes. That is, in case of DCI formats having payload lengths smaller than the maximum DCI format payload length, as many padding bits as the differences between the payload lengths and the maximum DCI format payload length are padded such that the DCI formats can have the same payload length. At this time, the padding bits can be used for virtual CRC detection wherein a predetermined value (e.g. 0, 1, −1, or an arbitrary value) can be used as a padding bit value. Meanwhile, A may be defined as the number of MIMO transmission modes that can be used according to downlink state, and thus DCI formats for all downlink MIMO transmission modes can have the same payload length. While the method of defining the padding bit and adding the padding bit to a DCI payload is used to set the MIMO transmission mode indicator for the DCI payload in the above description, it is also possible to use a bit or status, which is not used to represent control information of a DCI format having a maximum payload length from among DCI formats of MIMO transmission modes, that is, a in-field code point, for the DCI format. For example, a code point in an MCS, RV (Redundancy Version), RA (Resource Assignment) or TPMI (Transmit Precoding Matrix Indicator) field in LTE Rel-8 DCI format 2 or a DCI format newly defined in LTE Rel-10 can be used. In this case, for other MIMO transmission mode DCI formats that require payload length matching, part of extra padding bits can be defined as the MIMO transmission mode indicator and applied to the DCI formats, and the method of defining the MIMO transmission mode indicator of the DCI format having the maximum payload length can be applied to the DCI formats.

Similarly, bit padding using a bit 0 or an arbitrary value can be employed in order to make payload lengths corresponding to DCI formats of UL grant PDCCHs for one or more MIMO transmission modes from among MIMO transmission modes applicable to uplink PUSCH transmission equal to one another. To achieve this, a MIMO transmission mode indicator can be defined and included in the DCI formats. The length of an uplink MIMO transmission mode indictor can be defined as a $\lceil \log_2 B \rceil$ bit. Here, B denotes the number of uplink MIMO transmission modes having the same payload length. Accordingly, the payload length applied to all the DCI formats can be defined as the sum of the MIMO transmission mode indicator and a DCI format payload length corresponding to a MIMO transmission mode that requires a maximum payload length from among various MIMO transmission modes. That is, in case of DCI formats having payload lengths smaller than the maximum DCI format payload length, as many padding bits as the differences between the payload lengths and the maximum DCI format payload length are padded such that the DCI formats can have the same payload length. At this time, the padding bits can be used for virtual CRC detection wherein a predetermined value (e.g. 0, 1, −1, or an arbitrary value) can be used as a padding bit value. Meanwhile, B may be defined as the number of MIMO transmission modes that can be used according to uplink state, and thus DCI formats for all uplink MIMO transmission modes can have the same payload length. While the method of defining the padding bit and adding the padding bit to a DCI payload is used to set the uplink MIMO transmission mode indicator for the DCI payload in the above description, it is also possible to use a bit or status, which is not used to represent control information of a DCI format having a maximum payload length from among UL grant PDCCH DCI formats, that is, an in-field code point, for the DCI format. For example, it is possible to use a code point in an MCS, RA or TPMI field in a UL grant PDCCH DCI format for UL MIMO transmission, newly defined in LTE Rel-10. In this case, for other uplink MIMO transmission mode DCI formats that require payload length matching, part of extra padding bits can be defined as the MIMO transmission mode indicator and applied to the DCI formats, and the method of defining the MIMO transmission mode indicator of the DCI format having the maximum payload length can be applied to the DCI formats.

Furthermore, it is possible to determine a maximum DCI format payload length in consideration of one or more or all DCI formats for various downlink MIMO transmission modes and for various uplink MIMO transmission modes, and apply bit padding to the DCI formats for the various uplink and downlink MIMO transmission modes on the basis of the maximum DCI format payload length.

The MIMO transmission mode indicator and DCI formats used in the current scheme will now be described in detail.

When the MIMO transmission mode indicator is configured on the basis of a case in which DL allocation DCI formats for various downlink MIMO transmission modes have the same payload length or UL grant DCI formats for various uplink MIMO transmission modes have the same payload length, it is possible to consider a case in which a DL/UL DCI format indicator may be previously defined for DCI formats corresponding to one or more transmission modes from among the MIMO transmission modes. For example, the DL/UL DCI format indicator is defined as a 1-bit field under the condition that UL DCI format 0 and DL DCI format 1A have the same payload length. In this case, the MIMO transmission mode indicator and the DL/UL DCI format indicator may be defined as separate fields in DL/UL DCI formats, or they may be combined into one field in a DCI format to define a state.

The MIMO transmission mode indicator may be encoded separately from a DCI format payload and multiplexed with the DCI format payload. Here, multiplexing may be performed on the basis of encoded bits or on the basis of modulated symbols after a separate modulation operation is executed.

When DCI formats having the same payload length are used for various downlink MIMO transmission modes or various uplink MIMO transmission modes, dynamic mode adaptation can be performed for downlink MIMO transmissions or uplink MIMO transmissions using the MIMO transmission mode indicator. Furthermore, the MIMO transmission mode indicator proposed by the present invention can be used as an indicator for application of dynamic mode adaptation of a plurality of downlink MIMO transmission modes or uplink MIMO transmission modes. Here, dynamic mode adaptation may be represented as dynamic antenna mode fallback on the basis of characteristics of MIMO transmission modes using DCI formats having the same payload length. For example, a downlink closed-loop single-cell SU-MIMO transmission mode, a downlink closed-loop single-cell MU-MIMO transmission mode and a downlink closed-loop multi-cell MU-MIMO transmission mode can use DCI formats having the same payload length. In this case, when the three MIMO transmission modes are signaled to a UE through a UE-specific DL allocation PDCCH using DCI formats having the same payload length, dynamic mode adaptation for the three downlink MIMO transmission modes can be performed through the MIMO transmission mode indicator. As another example, an uplink closed-loop precoding transmission mode, an uplink open-loop transport diversity transmission mode and a single-antenna transmission mode can use DCI formats having the same payload length. In this case, when the three MIMO transmission modes are signaled to a UE through a UE-specific UL grant PDCCH using DCI formats having the same payload length, dynamic mode adaptation or dynamic antenna mode fallback for the three uplink MIMO transmission modes can be performed through the MIMO transmission mode indicator.

Scheme 2: Defining One DCI Format for One or More MIMO Transmission Modes

Scheme 2 defines one common DCI format for one or more MIMO transmission modes from among downlink MIMO transmission modes applicable to downlink PDSCH transmission, maps the common DCI format to the one or more MIMO transmission modes, defines one common DCI format for one or more MIMO transmission modes from among uplink MIMO transmission modes applicable to uplink PUSCH transmission and maps the common DCI format to the one or more MIMO transmission modes, rather than defining different DCI formats for a plurality of MIMO transmission modes. Scheme 1 adjusts payload lengths of DCI formats to be equal using a padding bit in payloads in the DCI formats on the premise that DCI formats are individually defined for MIMO transmission modes whereas Scheme 2 defines one DCI format for a plurality of downlink MIMO transmission modes and/or a plurality of uplink MIMO transmission modes.

A DCI format for one or more MIMO transmission modes from among downlink transmission modes may be defined as a common DCI format, and a DCI format for one or more MIMO transmission modes from among uplink transmission modes may be defined as a common DCI format. That is, different DCI formats can be respectively defined for a downlink MIMO transmission and an uplink MIMO transmission. Alternatively, one DCI format may be used for one or more transmission modes from among downlink MIMO transmission modes and one or more transmission modes from among uplink MIMO transmission modes.

In configuration of the DCI format, an indicator identifying MIMO transmission modes can be defined and included in the DCI format. If the number of MIMO transmission modes using one DCI format is C, the MIMO transmission mode indicator can be defined as a $\lceil \log_2 C \rceil$ bit.

The MIMO transmission mode indicator and DCI format used in Scheme 2 will now be described in detail.

When the MIMO transmission mode indicator is defined on the premise that one DL channel allocation DCI format is defined for one or more downlink MIMO transmission modes or one UL grant DCI format is defined for one or more uplink MIMO transmission modes, a case in which a DL/UL DCI format indicator is previously defined in a DCI format or required can be considered. In this case, the MIMO transmission mode indicator and the DL/UL DCI format indicator may be defined as separate fields in a DL/UL DCI format, or they may be combined into one field in a DCI format and defined as indication information for linking a MIMO transmission mode and the DL/UL DCI format. While Scheme 2 is described on the basis of field definition, a MIMO transmission mode can be indicated using a field state for other purposes, that is, a code point.

Meanwhile, the MIMO transmission mode indicator may be encoded separately from a DCI format payload and multiplexed with the DCI format payload. Here, multiplexing may be performed based on encoded bits or may be executed based on modulated symbols after separate modulation is performed.

When one DCI format is used for various downlink MIMO transmission modes or various uplink MIMO transmission modes, dynamic mode adaptation can be performed for downlink MIMO transmissions or uplink MIMO transmissions using the MIMO transmission mode indicator. Here, dynamic mode adaptation may be represented as dynamic antenna mode fallback on the basis of characteristics of MIMO transmission modes using the same DCI format. For example, a downlink closed-loop single-cell SU-MIMO transmission mode, a downlink closed-loop single-cell MU-MIMO transmission mode and a downlink closed-loop multi-cell MU-MIMO transmission mode can use the same DCI format. In this case, when the three MIMO transmission modes are signaled to a UE through a UE-specific DL allocation PDCCH using the same DCI format, dynamic mode adaptation for the three downlink MIMO transmission modes can be performed through the MIMO transmission mode indicator. As another example, an uplink closed-loop precoding transmission mode, an uplink open-loop transport diversity transmission mode and a single-antenna transmission mode can use the same DCI format. In this case, when the three MIMO transmission modes are signaled to a UE through a UE-specific UL grant PDCCH using the same DCI format, dynamic mode adaptation or dynamic antenna mode fallback for the three uplink MIMO transmission modes can be performed through the MIMO transmission mode indicator.

Scheme 3: Defining Some of Information, Included in a DCI Format, in a PDCCH Transmission Resource Region and Defining the Rest of the Information in a PDSCH Transmission Resource Region When different downlink MIMO transmission modes are applied carrier-specifically, different DCI formats are defined for the MIMO transmission modes. Specific control information in the different DCI formats may be transmitted through a DL allocation PDCCH and the remaining control information may be transmitted through a PDSCH or a physical resource region of the PDSCH.

Similarly, when different uplink MIMO transmission modes are applied carrier-specifically, different DCI formats are defined for the MIMO transmission modes. Specific control information in the different DCI formats may be transmitted through a UL grant PDCCH and the remaining control information may be downlink-transmitted to a corresponding UE or transmitted through a PDSCH intentionally designated or a physical resource region of the PDSCH. Here, a DL CC through which the PDSCH transmission is carried out may be set to a DL CC through which the UL grant PDCCH is transmitted. Otherwise, the PDSCH may be transmitted through a DL PCC of the corresponding UE unconditionally or a DL CC in a linkage relationship with a UL CC transmitting the PUSCH (designated through SIB2) according to LTE Rel-8, or established by an eNB. Application of Scheme 3 to a UL grant PDCCH may be limited to a case in which a PDSCH is transmitted to a UE in a corresponding downlink subframe.

In the following description, control information transmitted through a PDCCH (DL allocation PDCCH or UL grant PDCCH) transmission resource region, from among control information included in DCI formats for downlink or uplink MIMO transmission modes, is represented as DCI subgroup #1 and control information transmitted through a PDSCH transmission resource region is represented as DCI subgroup #2.

While DCI subgroup #1 can be commonly defined for uplink and downlink, it may also be defined as DL allocation DCI subgroup #1 and UL grant DCI subgroup #1 respectively for a downlink MIMO transmission mode and an uplink MIMO transmission mode. DCI subgroup #1 may be configured as control information or configured in at least a common payload length for part or all of a corresponding uplink MIMO transmission mode and downlink MIMO transmission mode. When DCI subgroup #1 is defined as DL channel allocation DCI subgroup #1 and UL grant DCI subgroup #1, DL channel allocation DCI subgroup #1 may be configured as control information or configured in at least a common payload length for part or all of a corresponding downlink MIMO transmission mode, and UL grant DCI subgroup #1 may be configured as control information or configured in at least a common payload length for part or all of a corresponding uplink MIMO transmission mode.

Accordingly, Scheme 3 can directly perform PDSCH decoding according to PDCCH (DCI subgroup #1) decoding, or decode DCI (DCI subgroup #2) on a PDSCH region and perform PDSCH decoding according to the DCI decoding result. Otherwise, Scheme 3 can decode DCI (DCI subgroup #2) on the PDSCH region according to PDCCH (DCI subgroup #1) and perform PUSCH transmission.

Examples of control information defined as DCI subgroup #1 include frequency resource allocation information, MIMO transmission mode indicator, PDSCH MCS (Modulation and Coding Scheme) index or PUSCH MCS index, new data indicator (NDI) for a specific transport block (for example, lowest transport block index) or all transport blocks, Redundancy Version (RV), PDSCH transmit PMI (TPMI), PUSCH TPMI, MIMO transmission mode for DCI subgroup #2, MCS index for DCI subgroup #2, transmission information for DCI subgroup #2, modulation symbol size, logic index, etc. One or more pieces of the control information can be included in DCI subgroup #1.

Control information included in DCI subgroup #1 may be configured with a combination of at least one of the above-mentioned pieces of control information. For example, control information that is common for corresponding MIMO transmission modes can be included in DCI subgroup #1. Here, control information required to demodulate and decode the DCI subgroup #2 can also be included in DCI subgroup #1. Otherwise, DCI subgroup #1 may be configured with only control information (e.g. frequency resource allocation information or DCI subgroup #2 MCS) required to demodulate and decode DCI subgroup #2, and most control information associated with PDSCH transmission and PUSCH transmission may be included in DCI subgroup #2.

The control information that can be defined as DCI subgroup #1 will now be described in detail.

(1) The frequency resource allocation information means information representing allocation of frequency resources used for transmission through a DL CC or a UL CC. The frequency resource allocation information is defined in a predetermined frequency resource granularity corresponding to a group of a number of subcarriers and can be represented as a subband. The size of a subband can be set to a granularity based on the bandwidth of a corresponding CC, that is, a group of another predetermined number of subcarriers.

(2) The MIMO transmission mode indicator indicates a corresponding MIMO transmission mode and can be included in a DCI format according to Scheme 3. If the number of MIMO transmission modes using one DCI format is C, the MIMO transmission mode indicator can be defined as a $\lceil \log_2 C \rceil$ bit.

When the MIMO transmission mode indicator is defined on the premise that one DL channel allocation DCI format is defined for one or more downlink MIMO transmission modes or one UL grant DCI format is defined for one or more uplink MIMO transmission modes, a case in which a DL/UL DCI format indicator is previously defined in a DCI format or required can be considered. In this case, the MIMO transmission mode indicator and the DL/UL DCI format indicator may be defined as separate fields in a DL/UL DCI format, or they may be combined into one field in a DCI format and set to a state.

The MIMO transmission mode indicator may be encoded separately from a DCI format payload and multiplexed with the DCI format payload. Here, multiplexing may be performed based on encoded bits or may be executed based on modulated symbols after separate modulation is performed.

When one DCI format is used for various downlink MIMO transmission modes or various uplink MIMO transmission modes, dynamic mode adaptation can be performed for downlink MIMO transmissions or uplink MIMO transmissions using the MIMO transmission mode indicator. Here, dynamic mode adaptation may be represented as dynamic antenna mode fallback on the basis of characteristics of MIMO transmission modes using the same DCI format. For example, a downlink closed-loop single-cell SU-MIMO transmission mode, a downlink closed-loop single-cell MU-MIMO transmission mode and a downlink closed-loop multi-cell MU-MIMO transmission mode can use the same DCI format. In this case, when the three MIMO transmission modes are signaled to a UE through a UE-specific DL allocation PDCCH using the same DCI format, dynamic mode adaptation for the three downlink MIMO transmission modes can be performed through the MIMO transmission mode indicator. As another example, an uplink closed-loop precoding transmission mode, an uplink open-loop transport diversity transmission mode and a single-antenna transmission mode can use the same DCI format. In this case, when the three MIMO transmission modes are signaled to a UE through a UE-specific UL grant PDCCH using the same DCI format, dynamic mode adaptation or dynamic antenna mode fallback for the three uplink MIMO transmission modes can be performed through the MIMO transmission mode indicator.

(3) The PDSCH MCS index or PUSCH MCS index is index information about a modulation and coding scheme for a PDSCH for downlink data transmission or a PUSCH for uplink data transmission in a corresponding format. A transmission type indicated by an MCS field may correspond to information of an MCS field defined in LTE systems (for example, release-8). The MCS index can be defined as MCS field information about two codewords (or transport blocks) for a precoding-based MIMO transmission mode using the two codewords (or transport blocks). Or the MCS index can be defined as MCS field information about only one (first codeword) of the two codewords (or transport blocks), and MCS field information about the remaining codeword (second codeword (or transport block)) may be included in DCI subgroup #2 which will be described later.

(4) NDI is a field that indicates new or initial transmission of a PDSCH for downlink data transmission or a PUSCH for uplink data transmission in a corresponding DCI format. A NDI value indicates new data transmission when it is toggled from a NDI value for previous transmission and indicates data transmission that is not new when it is equal to the NDI value for the previous transmission. NDI can indicate a specific transmission scheme (e.g. a scheme for nulling a specific codeword (or transport block) in retransmission) in association with designation of a specific state of MCS field in addition to the function of indicating new data transmission. NDI can be defined as NDI about two codewords (or transport blocks) for a precoding-based MIMO transmission mode using the two codewords (or transport blocks). Or NDI can be defined as NDI about only one (first codeword) of the two codewords (or transport blocks), and NDI about the remaining codeword (second codeword (or transport block)) may be included in the DCI subgroup #2 which will be described later.

(5) RV can be defined only in a downlink DCI format. RV indicates a start point of retransmitted data in circular buffer rate matching of retransmission. RV can be defined as RV field information about two codewords (or transport blocks) for a precoding-based MIMO transmission mode using the two codewords (or transport blocks). Or RV can be defined as RV field information about only one (first codeword) of the two codewords (or transport blocks), and RV field information about the remaining codeword (second codeword (or transport block)) may be included in DCI subgroup #2 which will be described later.

(6) PDSCH TPMI or PUSCH TPMI is a field that indicates a precoder index applied to downlink transmission or uplink transmission. If required, the MIMO transmission mode indicator can be included in a state or state group of TPMI.

(7) Control information regarding MIMO transmission modes for DCI subgroup #2 can be defined in DCI subgroup #1 as a control information field that designates a transmission mode for DCI subgroup #2 when transmission is dynamically changed or adapted.

(8) MCS index for DCI subgroup #2 can be defined in DCI subgroup #1 as a control information field that designates a corresponding MCS when dynamic change or adaptation of coding rate and modulation scheme is applied as link adaptation in transmission of DCI subgroup #2.

(9) Transmission information regarding DCI subgroup #2 or information about a modulation symbol size (modulation symbol size or a logical index) can be included in DCI subgroup #1. When there is need to indicate transmission control information or a size of physical resource to be set for DCI subgroup #2, the corresponding control information field can be defined in DCI subgroup #1.

DCI subgroup #2 is configured with control information other than control information transmitted through DCI subgroup #1 from among all DCI formats defined for MIMO transmission modes and can be transmitted through a PDSCH or a transmission resource region of the PDSCH. Accordingly, the size of DCI subgroup #2 can be defined. DCI subgroup #2 can include control information about PDSCH transmission or PUSCH transmission. Scheme 3 can be considered as a scheme applied to a DL channel allocation PDCCH. In case of a UL grant PDCCH, downlink data transmission may be performed for a corresponding UE, or control information of UL grant DCI subgroup #2 may be transmitted through an intentionally designated PDSCH or a physical resource region of the PDSCH. At this time, a DL CC for PDSCH transmission can be set to a DL CC for UL grant PDCCH transmission. Alternatively, the PDSCH may be transmitted through a DL PCC of the corresponding UE unconditionally or a DL CC in a linkage relationship with a UL CC transmitting the PUSCH (designated through SIB2) according to LTE Rel-8, or established by an eNB. Otherwise, Application of Scheme 3 to a UL grant PDCCH may be limited to a case in which a PDSCH is transmitted through a DL subframe.

DCI subgroup #2 may be encoded separately from the PDSCH and/or modulated to be multiplexed with the remaining PDSCH symbols in the physical resource region of the PDSCH, as a distinguished encoding symbol stream. The present invention proposes schemes for mapping modulation symbols for the control information of DCI subgroup #2 to PDSCH transmission resources on the assumption that PDSCH transmission.

Exemplary schemes for determining a resource location to which DCI subgroup #2 is mapped in a PDSCH region will now be described.

A first scheme maps control information symbols of DCI subgroup #2 first, and then maps PDSCH data transmission symbols to PDSCH data transmission physical resources (that is, physical resources other than reference signal transmission resources) on the premise that transmission symbols are mapped to downlink PDSCH physical resource elements in a frequency-first manner. Here, taking into account mapping of PDSCH data to physical resources other than physical resources to which control information transmission symbols of DCI subgroup #2 are mapped, a scheme for performing rate matching for PDSCH can be considered basically. However, since complexity or uncertainty of implementation may be generated (for example, since the number of transmission symbols of DCI subgroup #2 is changed according to circumstances), it is possible to puncture part of data resource elements and map control information symbols of DCI subgroup #2 instead of employing rate matching.

A second scheme maps control information symbols of DCI subgroup #2 to PDSCH data transmission physical resources (that is, physical resources other than reference signal transmission resources) starting from the last resource of the transmission physical resources in a reverse direction and maps PDSCH data transmission symbols to the transmission physical resources starting from the beginning of the transmission physical resources on the premise that transmission symbols are mapped to downlink PDSCH physical resource elements in a frequency-first manner. According to this scheme, since a PDSCH decoding start point is fixed, PDSCH transmission reliability can be maintained and complexity can be minimized. Here, taking into account mapping of PDSCH data to physical resources other than physical resources to which control information transmission symbols of DCI subgroup #2 are mapped, a scheme for performing rate matching for PDSCH can be considered basically. However, since complexity or uncertainty of implementation may be generated (for example, since the number of transmission symbols of DCI subgroup #2 is changed according to circumstances), it is possible to puncture part of data resource elements and map control information symbols of DCI subgroup #2 instead of employing rate matching.

Distinguished from the first and second schemes, a third scheme maps the control information symbols of DCI subgroup #2 to a fixed position (or fixed mapping start point or a resource region defined according to designation of an end point (that is, size) according to circumstances) in transmission physical resources. This scheme can be introduced in order to maintain accuracy of channel estimation for DCI subgroup #2 during decoding, or minimize PDSCH decoding deterioration when predetermined data puncturing is applied to a PDSCH. For example, control information of DCI subgroup #2 can be mapped to a transmission symbol in which a reference signal RE for PDSCH demodulation is present. Otherwise, the control information of DCI subgroup #2 may be mapped to a physical resource region or transmission symbol region having a low probability that a systematic bit exists when turbo coding is employed in order to minimize PDSCH decoding deterioration.

A description will be given of details that can be additionally considered for efficient transmission of DCI subgroup #2.

Firstly, in application of MCS and MIMO transmission mode to control information transmission symbols of DCI subgroup #2, the MCS and MIMO transmission mode may be previously defined as predetermined default values, or semi-statically configured in a higher layer of an eNB (or relay node) and signaled to a UE for effective physical resource mapping and robust transmission. Accordingly, MCS information and MIMO transmission mode for DCI subgroup #2 may not be included in DCI subgroup #1. They may be included in DCI subgroup #1 for confirmation purpose according to circumstances.

Secondly, when there is no PDCCH transmission or a UE misrecognizes a PDCCH destined for another UE as a PDCCH corresponding thereto (false-positive or false-alarm phenomenon) and thus performs erroneous decoding, CRC may be additionally defined and added to control information of DCI subgroup #2 to prevent the UE from performing erroneous decoding. CRC masking of DCI subgroup #2 can use a UE identifier (e.g. C-RNTI). At this time, while a UE identifier used for PDSCH may be applied, an indicator in a different form (having a small number of bits) may be previously defined and applied in case of a small CRC bit size. In addition, bit-level scrambling may be performed on encoding bits of DCI subgroup #2 using a predetermined sequence different from a sequence applied to the PDSCH.

Thirdly, in definition of control information for DCI subgroup #2, when control information such as MCS for a second codeword (or transport block) is included in DCI subgroup #2 in 2-codeword based MIMO transmission mode, the size of the control information needs to be minimized. Accordingly, the control information such as MCS regarding the first codeword (or transport block) may be transmitted through a PDCCH, and only information about the difference (that is, delta value) between the first codeword (or transport block) on the PDCCH and the second codeword (or transport block) may be included in DCI subgroup #2. Therefore, a bit size of control information regarding the second codeword (or transport block) included in DCI subgroup #2 can be set to smaller than the bit size of control information regarding the first codeword (or transport block) included in the PDCCH. Here, DCI subgroup #2 can be channel-coded with data in a transport layer (or transport stream) transmitting a first codeword (or transport block) in a PDSCH transmission physical resource region, or multiplexed after separate coding and then transmitted. Data of the first codeword (or transport block) may be subjected to rate matching or puncturing in physical resources.

Scheme 4: Restrictive Application of Cross-Carrier Scheduling

It is possible to configure DL CCs and UL CCs such that cross-carrier scheduling is not required and a situation in which the number of the UL CCs is greater than the number of the DL CCs (UL CC-heavy assignment) is not generated in order to prevent blind decoding overhead and complexity of a UE from increasing when a carrier-specific MIMO transmission mode is applied to downlink transmission or uplink transmission in CA.

To support this, a DL/UL active CC set can be configured (which may be represented as UE-specific carrier assignment) and a CC set through which a UE monitors a PDCCH can be configured.

Alternatively, it is possible to permit cross-carrier scheduling and UL CC-heavy assignment in such a manner that cross-carrier scheduling and UL CC-heavy assignment can be applied only in a restricted case in order to minimize increase of blind decoding overhead and complexity of a UE when a carrier-specific MIMO transmission mode is applied to downlink transmission or uplink transmission in CA.

For example, when cross-carrier scheduling is applied, the number of PDSCH transmission DL CCs for transmitting DL channel allocation PDCCHs through a DL CC can be set to smaller than N (N≥1). Similarly, the number of PUSCH transmission UL CCs for transmitting UL grant PDCCHs through the DL CC can be set to smaller than M (M≥1). In case of UL CC-heavy assignment, the number of UL CCs associated with one PDCCH transmission DL CC may be set to smaller than P (P≥1).

To prevent UL CC-heavy assignment, if a DL CC is deactivated when cross-carrier scheduling is applied, a UL CC, which linked with the DL CC according to the above-described method of the present invention, can also be deactivated. Accordingly, it is possible to reduce PDCCH blind decoding overhead of a UE by designating a UE-specific PDCCH search space for each CC, which is defined as a scheduling PDCCH transmittable resource region for the DL/UL CC pair, such that the UE needs not search the UE-specific PDCCH search space, or by not allowing the eNB and/or the UE to define a UE-specific PDCCH search space associated with the corresponding CC.

A scheme for restricting 4 CCE aggregation levels {1, 2, 4, 8}, currently defined by LTE Rel-8/9 for each MIMO transmission mode, can be used as a method for alleviating PDCCH blind decoding overhead in carrier-specific application of MIMO transmission modes in cross-carrier scheduling. For example, in a TxD or single-layer precoding transmission mode, a UE searches a corresponding UE-specific PDCCH search space for a PDCCH for all CCE aggregation levels {1, 2, 4, 8}. In a DCI format for a MIMO precoding transmission mode in which MIMO precoding transmission having a rank value of larger than 2 can be transmitted, that is, DCI format 2/2a in LTE Rel-8/9 or a DL SU-/MU-MIMO DCI format and a UL SU-MIMO DCI format, the UE can perform blind decoding in a corresponding UE-specific PDCCH search space only for CCE aggregation levels {1, 2} or {1, 2, 4}. This method can be used even when cross-carrier scheduling is not employed.

Scheme 5: Restrictive Application of Carrier-Specific MIMO Transmission Mode

Distinguished from Scheme 4, Scheme 5 can restrict available cases of MIMO transmission modes carrier-specifically set over a PDSCH received by a UE through downlink and a PUSCH transmitted by the UE through uplink instead of restricting cross-carrier scheduling or UL CC-heavy assignment.

For example, a transport diversity scheme or single-antenna transmission mode, which can be considered on downlink or uplink, can be set based on UE-specific channel state (for example, Doppler frequency of a UE or long-term wideband SINT state) rather than being set based on carrier-specific channel state. In view of this, the transport diversity scheme or single-antenna transmission mode can be defined as a MIMO transmission scheme for achieving downlink PDSCH transmission and uplink PUSCH transmission for the UE through one or more CCs.

Alternatively, when cross-carrier scheduling or UL CC-heavy assignment is applied, it is possible to set rank-1 wideband precoding based on long-term wideband PMI feedback or in an open-loop form instead of transport diversity (setting payload length different from those of other MIMO transmission modes in DCI formats) or single-antenna transmission mode. In other words, rank-1 wideband precoding replaces the transport diversity scheme or single-antenna transmission mode to configure a carrier-specific transmission mode in consideration of SU-/MU-MIMO precoding transmission modes including rank-1 transmission. The transport diversity scheme or single-antenna transmission mode is defined as a UE-specific transmission mode instead of a carrier-specific transmission mode on the assumption that the transport diversity scheme or single-antenna transmission mode uses a DCI format different from those of other precoding based MIMO transmission modes. Open-loop (which can be channel-individually represented in case of uplink) rank-1 wideband precoding as a carrier-specific transmission mode can replace the transport diversity scheme or single-antenna when PDSCH transmission through a plurality of DL CCs or PUSCH transmission through a plurality of UL CCs is set. At this time, rank-1 precoding may be based on long-term feedback or wideband precoding. Restrictive UE-specific application of transport diversity scheme or single-antenna transmission mode can be employed only when cross-carrier scheduling or UL CC-heavy assignment is set considering that PDCCH blind decoding overhead of the UE can be alleviated in case of cross-carrier scheduling or UL CC-heavy assignment.

Scheme 5 can be applied to even a case in which a UE-specific PDCCH search space is defined for a DL CC transmitting a PDSCH, a UL CC transmitting a PUSCH, or each pair of a DL CC and a UL CC linked with each other.

Scheme 6: Restrictive Application of MIMO Transmission Mode for Each CC in Cross-Carrier Scheduling As a special scheme for applying cross-carrier scheduling, Scheme 6 configures the same downlink MIMO transmission mode or configures the same DCI format or MIMO transmission modes having the same DCI format for PDSCH transmission DL CCs when a DL channel allocation PDCCH for a downlink PDSCH is transmitted through a specific DL CC such that cross-carrier scheduling for PDSCHs corresponding to one or more DL CCs is executed.

For example, when one or more DL CCs for transmitting DL channel allocation PDCCHs are configured specifically to a downlink receiver (UE or relay node) or to a downlink transmitter (eNB or relay node) while cross-carrier scheduling is employed, for respective DL CCs that transmit PDCCHs to which cross-carrier scheduling is applied, the same MIMO transmission mode can be set for PDSCHs allocated through the PDCCHs and transmitted over one or more DL CCs, or MIMO transmission modes having the same DCI format can be set for the PDSCHs. Accordingly, a maximum number of MIMO transmission modes applicable to PDSCH transmission for a downlink receiver can be set to the number of DL CCs through which DL channel allocation PDCCHs are transmitted for corresponding PDSCHs. Similarly, for one or more UL CCs for which PUSCH transmission is cross-carrier-scheduled by a UL grant PDCCH transmitted through a specific DL CC, the same uplink MIMO transmission mode may be set for the one or more UL CCs. In other words, the same MIMO transmission mode can be set for DL/UL CCs scheduled according to cross-carrier scheduling, or MIMO transmission modes having the same payload length can be set for the DL/UL CCs. This can be represented that DL/UL CCs set to the same MIMO transmission mode or respectively set to MIMO transmission modes having the same payload length are combined such that cross-carrier scheduling is performed using a UL grant/DL allocation PDCCH transmitted through a specific DL CC.

Cross-carrier scheduling that transmits a PDCCH through a specific DL CC can be performed for PDSCH transmission through a plurality of DL CCs or PUSCH transmission through a plurality of UL CCs, which requires DL channel allocation PDCCHs or UL grant PDCCHs having the same payload length. For example, when SU-MIMO and MU-MIMO as downlink transmission modes defined by LTE Rel-10 are set to the same DCI format payload length (for example, A) and transport diversity (T×D) or single-antenna port based transmission mode (single antenna transmission mode) is set to a DCI format payload length (for example, B) which is different from the above-mentioned DCI format payload length (A), a downlink receiver (UE or relay node) can blind-decode a PDCCH on the assumption that the PDCCH is transmitted based on a DCI format payload length designated specifically for one or more DL CCs. The downlink receiver performs blind decoding in such a manner that it decodes the PDCCH on the assumption that the DCI format payload length is A, receives a PDSCH or transmits a PUSCH in a SU-MIMO/MU-MIMO transmission mode according to control information indicated by the PDCCH if decoding is appropriately performed, and attempts to decode the PDCCH on the assumption that the other DCI format payload length is B if the decoding is not appropriately performed. Information about the DCI format payload length may be signaled to the downlink receiver through L1/L2 control signaling or RRC signaling. According to Scheme 6, the downlink transmitter (eNB or relay node) transmits PDCCHs having the same DCI format payload length to the downlink receiver through a specific PDCCH transmission DL CC.

Scheme 6 can be applied even to a case in which a UE-specific PDCCH search space is defined for a DL CC transmitting a PDSCH, a UL CC transmitting a PUSCH, or each pair of a DL Cc and a UL CC linked with each other.

Schemes 1 to 6 can be applied together. For example, when a carrier-specific MIMO transmission mode is set in CA, one of Schemes 1 to 6 can be applied to set a downlink PDSCH transmission related PDCCH transmission scheme/mode and an uplink PUSCH transmission related PDCCH transmission scheme/mode, and different schemes can be applied to downlink and uplink. Otherwise, one or more of Schemes 1 to 6 can be simultaneously applied to set a downlink PUSCH transmission related PDCCH transmission scheme/mode, or one or more of Schemes 1 to 6 can be simultaneously applied to set an uplink PUSCH transmission related PDCCH transmission scheme/mode. In doing so, it is possible to alleviate overhead and complexity of PDCCH blind decoding performed by the downlink receiver.

Scheme Considering Different RA Field Sizes or Different Precoding Information Field Sizes The above-described schemes can effectively alleviate blind decoding overhead at a downlink receiver, caused by transmission of DL channel allocation PDCCHs or UL grant PDCCHs through DL CCS, to which different DCI formats are applied, when different MIMO transmission modes are respectively applied to DL CCs or UL CCs and cross-carrier scheduling or UL CC-heavy assignment is employed. Meanwhile, as described above, a DCI format of a DL channel allocation PDCCH for PDSCH transmission through a DL CC or a DCI format of a UL grant PDCCH for PUSCH transmission through a UL CC may be varied due to a RA field size difference caused by a carrier bandwidth (or system bandwidth) difference among DL CCs or a precoding information field size difference caused by different transmit antenna ports (logical transmit antenna indexes defined as distinguished reference signals) for carriers. That is, the DCI format of the DL allocation PDCCH and the DCI format of the UL grant PDCCH can be determined such that they are different from each other. Even in this case, the aforementioned schemes according to the present invention can be applied. For example, when blind decoding overhead at a downlink receiver increases due to a RA field size difference or a precoding information field size difference, the solutions of Schemes 1 to 6 can be applied. Explanations on application of the schemes are omitted.

A description will be given of detailed methods regarding Schemes 1 to 6 applied when blind decoding overhead at a downlink receiver increases due to a RA field size difference or a precoding information field size difference.

A scheme for reducing blind decoding overhead at the downlink receiver when cross-carrier scheduling is employed is described for a case in which a DCI format of a DL channel allocation PDCCH or UL grant PDCCH is varied due to a RA field size difference caused by a carrier bandwidth (or system bandwidth) difference among DL CCs.

Scheme A

Different UE-specific PDCCH search spaces can be defined for PDCCHs having different DCI formats, specifically to the downlink receiver (UE or relay node). For example, the number of attempts to perform blind decoding, which is allowed for each CCE aggregation level, can be assigned for each of DL channel allocation PDCCHs having different DCI formats. Similarly, the number of attempts to perform blind decoding may be assigned for each of UL grant PDCCHs having different DCI formats. In addition, different numbers of attempts to perform blind decoding may be respectively assigned for a DL allocation DCI format and a UL allocation DCI format since the DL allocation DCI format and UL allocation DCI format are different from each other in general. Furthermore, the number of attempts to perform blind decoding may be allocated for each pair of a DL channel allocation PDCCH and a UL grant PDCCH having different DCI formats. Scheme A can be applied to even a case in which a UE-specific PDCCH search space is defined for a DL CC through which a PDSCH is transmitted, a UL CC through which a PUSCH is transmitted, or each pair of a DL CC and a UL CC linked with each other. Alternatively, the number of cases of CCE aggregation levels for blind decoding can be restricted according to downlink or uplink MIMO transmission mode characteristics for each UE-specific PDCCH search space.

A receiver (e.g. UE) can perform blind decoding based on a UE-specific PDCCH search space defined by an eNB. Here, the UE can identify the PDCCH search space from an input parameter (which can be provided to the UE through UE-specific RRC signaling) of a UE-specific hashing function or through search space information (position of the search space) which is previously provided through RRC signaling UE-specifically, directly or indirectly.

Scheme B

Control information that provides DCI format information can be used. For instance, the DCI format information can be configured with $\lceil \log_2 Z \rceil$ bits when the number of DL channel allocation PDCCHs and UL grant PDCCHs having different DCI formats is Z. The DCI format information can be encoded separately from DL channel allocation DCI or UL grant DCI such that a receiver that receives the DCI format information can confirm it before DCI decoding. Alternatively, the DCI format information can be provided through predetermined scrambling for DCI or CRC added to DCI such that the UE can implicitly confirm the DCI format information.

Scheme C

Control information field sizes that cause a DCI format difference can be defined to a single field size in order to configure DCI formats in the same size. For example, predetermined bit padding can be applied on the basis of a maximum control information field size. Accordingly, a DL allocation DCI format and a UL grant DCI format, which are set to different sizes in general, can be set to the same size according to bit padding. In addition, when control information field sizes are set to a single field size, indication granularity of control information may be controlled such that the field sizes correspond to a minimum control information field size.

Scheme D

Similarly to scheme 3 with respect to MIMO transmission mode and cross-carrier scheduling, if information pieces having different field sizes are present, DCI information pieces having a common field size can be defined as a common DCI format (which can be regarded as DCI subgroup #1) and transmitted through a PDCCH, and information pieces having different field sizes can be separately defined as DCI subgroup #2 and transmitted through a PDSCH.

Alternatively, control information pieces having different sizes are separated from control information pieces on the basis of a minimum size, control information pieces having a common size can be included in DCI subgroup #1 and transmitted through a PDCCH. The remaining control information pieces having different field sizes can be transmitted through a PDSCH. This can be applied to DL channel assignment.

While Schemes A to D have been applied to a case in which DCI formats of a DL channel allocation PDCCH and a UL grant PDCCH differ from each other due to a RA field size difference, Schemes A to D can be applied to a case in which DCI formats of a DL channel allocation PDCCH and a UL grant PDCCH differ from each other due to a precoding information field size difference according to different transmit antenna ports for DL CCs in the same manner.

Meanwhile, even in a LTE-A system, overhead and complexity of PDCCH blind decoding performed by a downlink receiver may increase when cross-carrier scheduling or UL CC-heavy assignment is applied.

For example, when downlink SU-MIMO and MU-MIMO are set to a single DCI format in a LTE-A system and a transport diversity scheme specific to the LTE-A system is not defined, one DCI format is defined for various MIMO transmission modes from the standpoint of MIMO operation of a single cell. If uplink SU-MIMO is set and a transport diversity scheme for PUSCH transmission is not defined, the uplink SU-MIMO and uplink MU-MIMO are set to one DCI format. When MU-MIMO is set to the same DCI format as the single-antenna port mode while a DCI format for SU-MIMO is separately defined, one DCI format is defined from the standpoint of single-cell MIMO operation. In this case, overhead and complexity of PDCCH blind decoding performed by a UE operating in the LTE-A system (referred to as LTE-A UE hereinafter) may increase when cross-carrier scheduling or UL CC-heavy assignment is applied. Solutions to this problem will now be described.

When at least cross-carrier scheduling is applied or in case of UL CC-heavy assignment, transmission modes (for example, transmission modes defined by LTE release-8) other than the single-antenna mode from among downlink transmission modes for a LTE-A UE serving as a downlink receiver are not set. In other words, downlink transmission modes for LTE-A UEs can be set to the single-antenna mode and/or transmission modes defined by LTE-A systems (set to one DCI format). In case of uplink transmission, there is no need to consider the above-mentioned problem since only the single-antenna port mode (single-antenna mode) is defined in LTE systems (release-8/9).

When cross-carrier scheduling or UL CC-heavy assignment is applied, the single-antenna mode and multi-antenna mode (transport diversity may be excluded) may be set UE-specifically instead of carrier-specifically for downlink and/or uplink transmission for a LTE-A UE. If a transmission mode is set such that the same DCI format as the single-antenna mode is used on downlink or uplink for transport diversity, the transport diversity can be set UE-specifically like the single-antenna mode. If fallback to the transport diversity is supported in a multi-antenna mode DCI format, the transport diversity can be applied as a carrier-specific transmission mode according to signaling from the multi-antenna mode DCI format. That is, fallback from a DCI format for a transmission mode instead of transport diversity to carrier-specific transport diversity can be made.

In addition, when a transmission mode defined by a LTE system (for example, LTE release-8 or 9) is configured for a LTE-A UE on downlink, a LTE system transmission mode can be set UE-specifically rather than carrier-specifically in case of cross-carrier scheduling or UL CC-heavy assignment. Otherwise, when a LTE system transmission mode is carrier-specifically configured for a LTE-A UE, cross-carrier scheduling may not be applied or UL CC-heavy assignment may not set.

Figure 15:
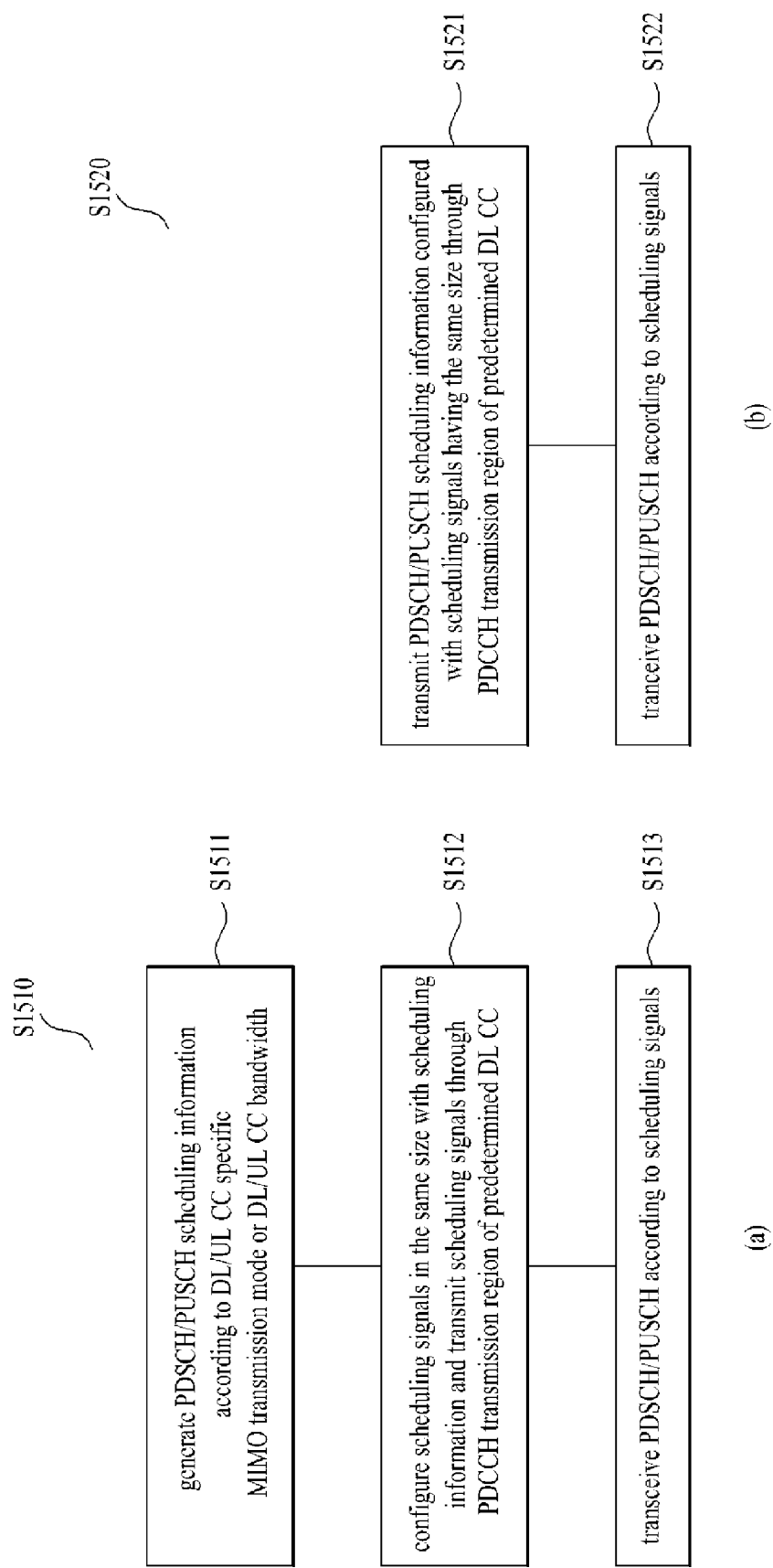
FIG. 15 is a flowchart illustrating a method for transmitting and receiving scheduling signals according to the present invention.

FIG. 15 is a flowchart illustrating a method for transmitting and receiving scheduling signals according to the present invention.

FIG. 15(a) illustrates a method (S1510) for transmitting scheduling signals at an eNB (or relay node as a downlink transmitter) and FIG. 15(b) illustrates a method for receiving scheduling signals at a UE (or relay node as a downlink receiver).

Referring to FIG. 15(a), the eNB may generate different pieces of information based on different MIMO transmission modes or bandwidths respectively assigned for DL CCs or different MIMO transmission modes or bandwidth respectively assigned for UL CCs in step S1511. As described above, DL allocation PDCCHs or UL grand PDCCHs may have different DCI format payload lengths due to the different MIMO transmission modes or CC bandwidths.

The eNB may transmit scheduling signals configured in DCI formats of DL allocation PDCCHs for one or more DL CCs (cross-carrier-scheduled DL CCs) or UL grant PDCCHs for one or more UL CCs (cross-carrier-scheduled UL CCs) through a PDCCH transmission region of a predetermined DL CC (e.g. primary carrier), that is, a UE-specific PDCCH search space in step S1512. Here, the eNB can configure the scheduling signals in the same size in order to alleviate blind decoding overhead and complexity of the UE that receives the scheduling signals. That is, the scheduling signals transmitted through the PDCCH transmission region may have the same payload length even if CCs have different MIMO transmission modes or bandwidths.

The above-mentioned schemes proposed by the present invention can be applied to configure the scheduling signals (DL allocation PDCCH DCI formats or UL grant PDCCH DCI formats) in the same size. For example, scheduling signals used for cross-carrier scheduling can be configured in the same size using bit padding. Otherwise, it is possible to configure scheduling signals transmitted through a PDCCH transmission region of a predetermined DL CC in the same size by transmitting only control information pieces (DCI subgroup #1) which are common for the scheduling signals through the PDCCH transmission region and transmitting the remaining control information (DCI subgroup #2) through a PDSCH transmission region. In addition, scheduling signals having the same size can be configured using various schemes. Details of schemes for configuring scheduling signals having the same size refer to the descriptions of the aforementioned various schemes of the present invention.

The eNB may perform PDSCH/PUSCH transmission and reception according to the transmitted scheduling signals (DL allocation PDCCH DCI formats or UL grant PDCCH DCI formats) in step S1513. That is, the eNB can transmit a PDSCH to the UE based on a DL allocation PDCCH or receive a PUSCH from the UE based on a UL grant PDCCH.

Referring to FIG. 15(b), the UE may receive scheduling signals (DL allocation or UL grant PDCCHs) having the same signal through a PDCCH transmission region of a predetermined DL CC (for example, primary carrier) in step S521. Since the UE receives the scheduling signals having the same size, overhead and complexity of PDCCH blind decoding performed by the UE can be reduced. The scheduling signals can be configured by the eNB (steps S1511 and S1512).

The UE may perform PDSCH/PUSCH transmission and reception on the basis of the decoded scheduling signals in step S1522. That is, the UE can receive a PDSCH based on a DL allocation PDCCH or transmit a PUSCH to the eNB through a resource designated based on a UL grant PDCCH.

The method for transmitting and receiving scheduling signals according to the present invention, described with reference to FIG. 15, is an exemplary method to which the various schemes for transmitting scheduling signal according to the present invention can be applied, so that the present invention is not limited thereto. That is, the scheduling signals can be configured according to the various schemes of the present invention when the method of FIG. 15 is performed.

Figure 16:
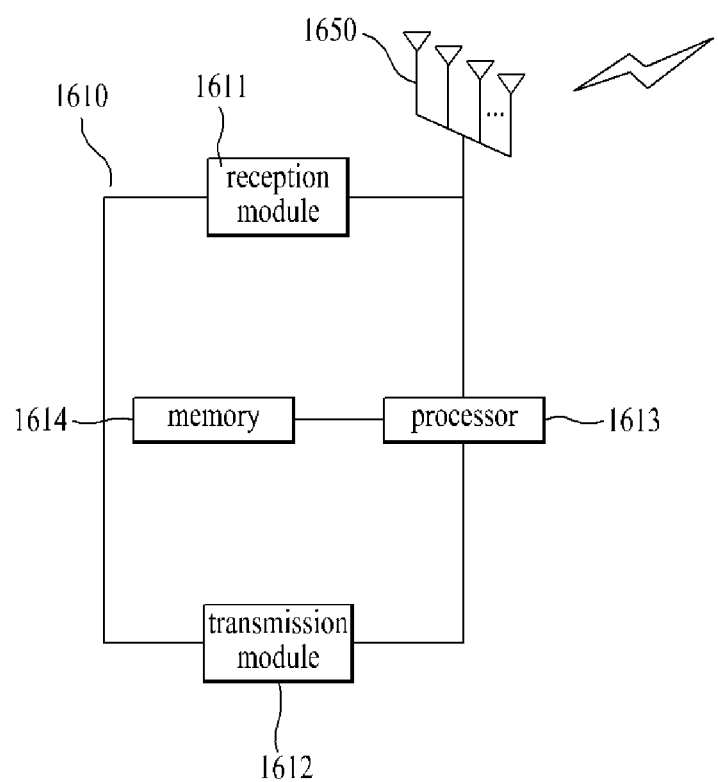
FIG. 16 illustrates a configuration of a base station or a UE according to an embodiment of the present invention.

FIG. 16 is a block diagram of an eNB apparatus and a UE apparatus according to an embodiment of the present invention. In FIG. 16, description about the eNB apparatus can be applied to a relay node apparatus as a downlink transmitter and description about the UE apparatus can be applied to a relay node apparatus as a downlink receiver.

Referring to FIG. 16, the eNB apparatus may include a reception module 1611, a transmission module 1612, a processor 1613, a memory 1614, and a plurality of antennas 1650. The plurality of antennas 1650 support MIMO transmission and reception.

The reception module 1611 may receive uplink (or backhaul uplink) signals, data and information from UEs (or relay nodes). The transmission module 1612 may transmit downlink (or backhaul downlink) signals, data and information to UEs (or relay nodes). The processor 1613 may provide overall control to the eNB apparatus.

The processor 1613 of the eNB apparatus may be configured to transmit one or more PDSCH transmission scheduling signals on one or more DL CCs and/or one or more PUSCH transmission scheduling signals on one or more UL CCs through a predetermined DL CC and transceiver the PDSCH and/or the PUSCH according to the scheduling signals. When different MIMO transmission modes are applied to PDSCH transmission or PUSCH transmission, or the one or more DL CCs or one or more UL CCs have different bandwidths, the scheduling signals may be defined to the same size in a PDCCH transmission region of the predetermined DL CC.

The UE apparatus may include a reception module 1611, a transmission module 1621, a processor 1613, a memory 1614, and a plurality of antennas 1650. The plurality of antennas 1650 support MIMO transmission and reception.

The reception module 1611 may receive downlink (or access downlink) signals, data and information from an eNB (or relay node). The transmission module 1612 may transmit uplink (or access uplink) signals, data and information to an eNB (or relay node). The processor 1613 may provide overall control to the UE apparatus.

The processor 1613 of the UE apparatus may be configured to receive one or more PDSCH transmission scheduling signals on one or more DL CCs and/or one or more PUSCH transmission scheduling signals on one or more UL CCs through a predetermined DL CC and transceive the PDSCH and/or the PUSCH according to the scheduling signals. When different MIMO transmission modes are applied to PDSCH transmission or PUSCH transmission, or the one or more DL CCs or one or more UL CCs have different bandwidths, the scheduling signals may be defined to the same size in a PDCCH transmission region of the predetermined DL CC.

In addition, the processor 1613 of the eNB apparatus or UE apparatus may process information received by the eNB apparatus or UE apparatus, information to be transmitted, etc. The memory 1614 may store processed information for a predetermined time and may be replaced by a component such as a buffer (not shown).

The embodiments according to the present invention can be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Various embodiments have been described in the best mode for carrying out the invention. The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As described above, the embodiments of the present invention can be applied to a variety of mobile communication systems.

The invention claimed is:

1. A method by a base station for transmitting scheduling signals in a wireless communication system supporting carrier aggregation of a plurality of component carriers (CCs) assigned to a user equipment (UE), the method comprising:
    transmitting, by the base station to the UE, via a primary component carrier, a first downlink scheduling signal for Physical Downlink Shared Channel (PDSCH) transmission on a first downlink component carrier (DL CC) assigned to the UE, and transmitting a second downlink scheduling signal for PDSCH transmission on a second DL CC assigned to the UE when carrier aggregation is applied; and
    transmitting, by the base station to the UE, the PDSCH according to the first downlink scheduling signal, and transmitting, by the base station to the UE, the PDSCH according to the second downlink scheduling signal,
    wherein a Multiple Input Multiple Output (MIMO) transmission mode of the first DL CC is set to a first mode and the MIMO transmission mode of the second DL CC is set to a second mode,
    wherein if the first mode is different from the second mode, a downlink control information (DCI) format of the first downlink scheduling signal is set different from the DCI format of the second downlink scheduling signal, and
    wherein the payload length of the DCI format of the first downlink scheduling signal is set equal to the payload length of the DCI format of the second downlink scheduling signal using a padding bit based on the DCI format having the maximum payload length.

2. The method of claim 1, wherein the first and second downlink scheduling signals are defined as the same payload length of DCI formats transmitted in the PDCCH transmission region of the predetermined DL CC when the first and second DL CCs have different bandwidths.

3. The method of claim 1, wherein the first and second downlink scheduling signals include a MIMO transmission mode indicator.

4. The method of claim 1, wherein the first and second downlink scheduling signals are defined as the same payload length of DCI formats by transmitting, in the PDCCH transmission region of the predetermined DL CC, common control information from among scheduling information having different payload lengths for different MIMO transmission modes, and the remaining control information other than the common control information is transmitted in a PDSCH transmission region of the predetermined DL CC.

5. The method of claim 4, wherein the common control information includes at least one of frequency resource allocation information, a MIMO transmission mode indicator, modulation and coding scheme (MCS) indexes for PDSCH and PUSCH, a new data indicator (NDI), a redundancy version (RV), a PDSCH transmission precoding matrix index (TPMI), MIMO transmission modes for the remaining control information, MCS indexes for the remaining control information, or information about physical resource sizes for the remaining control information.

6. The method of claim 1, wherein the first and second downlink scheduling signals are configured in a downlink control information (DCI) format.

7. The method of claim 1, wherein the method further comprising:
transmitting, via a primary component carrier, a first uplink scheduling signal for Physical Uplink Shared Channel (PUSCH) transmission on a first UL CC, and transmitting a second uplink scheduling signal for PDSCH transmission on a second DL CC when carrier aggregation is applied; and
receiving the PUSCH according to the first uplink scheduling signal, and receiving the PUSCH transmission to the second uplink scheduling signal,
wherein a Multiple Input Multiple Output (MIMO) transmission mode of the first DL CC is set to a first mode and the MIMO transmission mode of the second DL CC is set to a second mode,
wherein if the first mode is different from the second mode, a downlink control information (DCI) format of the first downlink scheduling signal is set different from the DCI format of the second downlink scheduling signal, and
wherein the payload length of the DCI format of the first downlink scheduling signal is set equal to the payload length of the DCI format of the second downlink scheduling signal using a padding bit based on the DCI format having the maximum payload length.

8. The method of claim 7, wherein the first and second uplink scheduling signals are defined to the same payload length of DCI formats transmitted in the PDCCH transmission region of the predetermined DL CC when the first and second UL CCs have different bandwidths.

9. A method by a user equipment (UE) for receiving scheduling signals in a wireless communication system supporting carrier aggregation of a plurality of component carriers (CCs) assigned to the UE, the method comprising:
receiving, by the UE from a base station, via a primary component carrier, a first downlink scheduling signal for Physical Downlink Shared Channel (PDSCH) transmission on a first downlink component carrier (DL CC) assigned to the UE, and receiving a second downlink scheduling signal for PDSCH transmission on a second DL CC assigned to the UE when carrier aggregation is applied; and
receiving, by the UE from the base station, the PDSCH according to the first downlink scheduling signal, and receiving, by the UE from the base station, the PDSCH according to the second downlink scheduling signal,
wherein a Multiple Input Multiple Output (MIMO) transmission mode of the first DL CC is set to a first mode and the MIMO transmission mode of the second DL CC is set to a second mode,
wherein if the first mode is different from the second mode, a downlink control information (DCI) format of the first downlink scheduling signal is set different from the DCI format of the second downlink scheduling signal, and
wherein the payload length of the DCI format of the first downlink scheduling signal is set equal to the payload length of the DCI format of the second downlink scheduling signal using a padding bit based on the DCI format having the maximum payload length.

10. The method of claim 9, wherein the first and second downlink scheduling signals are defined as the same payload length of DCI formats transmitted in the PDCCH transmission region of the predetermined DL CC when the first and second DL CCs have different bandwidths.

11. The method of claim 9, wherein the first and second downlink scheduling signals include a MIMO transmission mode indicator.

12. The method of claim 9, wherein the first and second downlink scheduling signals are defined to the same payload length of DCI formats by transmitting, in the PDCCH transmission region of the predetermined DL CC, common control information from among scheduling information having different payload lengths for different MIMO transmission modes, and the remaining control information other than the common control information is transmitted in a PDSCH transmission region of the predetermined DL CC.

13. The method of claim 12, wherein the common control information includes at least one of frequency resource allocation information, a MIMO transmission mode indicator, modulation and coding scheme (MCS) indexes for PDSCH and PUSCH, a new data indicator (NDI), a redundancy version (RV), a PDSCH transmission precoding matrix index (TPMI), MIMO transmission modes for the remaining control information, MCS indexes for the remaining control information, or information about physical resource sizes for the remaining control information.

14. The method of claim 9, wherein the first and second downlink scheduling signals are configured in a downlink control information (DCI) format.

15. A base station that transmits scheduling signals in a wireless communication system supporting carrier aggregation of a plurality of component carriers (CCs) assigned to a user equipment (UE), the base station comprising:
a reception module;
a transmission module; and
a processor,
wherein the processor is configured to:
transmit, to the UE, via a primary component carrier, a first downlink scheduling signal for Physical Downlink Shared Channel (PDSCH) transmission on a first downlink component carrier (DL CC) assigned to the UE, and transmit a second downlink scheduling signal for PDSCH transmission on a second DL CC assigned to the UE when carrier aggregation is applied; and
transmit, to the UE, the PDSCH according to the first downlink scheduling signal, and transmit, to the UE, the PDSCH according to the second downlink scheduling signal,
wherein a Multiple Input Multiple Output (MIMO) transmission mode of the first DL CC is set to a first mode and the MIMO transmission mode of the second DL CC is set to a second mode,
wherein if the first mode is different from the second mode, a downlink control information (DCI) format of the first downlink scheduling signal is set different from the DCI format of the second downlink scheduling signal, and
wherein the payload length of the DCI format of the first downlink scheduling signal is set equal to the payload length of the DCI format of the second downlink scheduling signal using a padding bit based on the DCI format having the maximum payload length.

16. A User Equipment (UE) that receives scheduling signals in a wireless communication system supporting carrier aggregation of a plurality of component carriers (CCs) assigned to the UE, the UE comprising:

a reception module;

a transmission module; and a processor for controlling the reception module and the transmission module, wherein the processor is configured to:

receive, from a base station, via a primary component carrier, a first downlink scheduling signal for Physical Downlink Shared Channel (PDSCH) transmission on a first downlink component carrier (DL CC) assigned to the UE, and receive a second downlink scheduling signal for PDSCH transmission on a second DL CC assigned to the UE when carrier aggregation is applied; and receive, from a base station, the PDSCH according to the first downlink scheduling signal, and receive, from a base station, the PDSCH according to the second downlink scheduling signal, wherein a Multiple Input Multiple Output (MIMO) transmission mode of the first DL CC is set to a first mode and the MIMO transmission mode of the second DL CC is set to a second mode, wherein if the first mode is different from the second mode, a downlink control information (DCI) format of the first downlink scheduling signal is set different from the DCI format of the second downlink scheduling signal, and wherein the payload length of the DCI format of the first downlink scheduling signal is set equal to the payload length of the DCI format of the second downlink scheduling signal using a padding bit based on the DCI format having the maximum payload length.

* * * * *